(12) United States Patent
Akah et al.

(10) Patent No.: US 12,351,760 B2
(45) Date of Patent: Jul. 8, 2025

(54) MODIFIED ZSM-5 FOR STEAM ENHANCED CATALYTIC CRACKING OF CRUDE OIL TO LIGHT OLEFINS AND AROMATICS

(71) Applicants: Saudi Arabian Oil Company, Dhahran (SA); King Fahd University of Petroleum and Minerals, Dhahran (SA)

(72) Inventors: Aaron Chi Akah, Dhahran (SA); Musaed Salem Al-Ghrami, Dammam (SA); Abdullah Mohammed Aitani, Khobar (SA); Ziyauddin Qureshi, Dhahran (SA); Mohammed Abdul Bari Siddiqui, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 39 days.

(21) Appl. No.: 18/181,644

(22) Filed: Mar. 10, 2023

(65) Prior Publication Data

US 2024/0301297 A1    Sep. 12, 2024

(51) Int. Cl.
*C10G 11/05*        (2006.01)
*B01J 29/40*        (2006.01)
(Continued)

(52) U.S. Cl.
CPC ............. *C10G 11/05* (2013.01); *B01J 29/405* (2013.01); *B01J 29/44* (2013.01); *B01J 29/46* (2013.01);
(Continued)

(58) Field of Classification Search
CPC ........ C10G 11/05; B01J 29/405; B01J 35/023
See application file for complete search history.

(56) References Cited

U.S. PATENT DOCUMENTS

| | | | | |
|---|---|---|---|---|
| 3,758,403 | A | * | 9/1973 | Rosinski ............... C10G 11/05 502/67 |
| 4,732,881 | A | * | 3/1988 | Le Van Mao .......... C10G 63/04 502/64 |

(Continued)

FOREIGN PATENT DOCUMENTS

| | | |
|---|---|---|
| CN | 107971015 A | 5/2018 |
| CN | 114425417 A | 5/2022 |

(Continued)

OTHER PUBLICATIONS

Akah et al., "An Overview of Light Olefins Production via Steam Enhanced Catalytic Cracking", Catalysis Surveys from Asia, vol. 23, No. 4, 2019.

(Continued)

*Primary Examiner* — Ellen M McAvoy
*Assistant Examiner* — Ming Cheung Po
(74) *Attorney, Agent, or Firm* — Dinsmore & Shohl LLP

(57) ABSTRACT

A process for upgrading a hydrocarbon feed comprises contacting the hydrocarbon feed with steam in the presence of a cracking catalyst composition at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst composition comprises a cracking additive comprising metal species impregnated on a ZSM-5 zeolite, where the metal species comprises a metal selected from the group consisting of chromium, vanadium, iron, platinum, molybdenum, cerium, and nickel.

13 Claims, 9 Drawing Sheets
(1 of 9 Drawing Sheet(s) Filed in Color)

(51) Int. Cl.

| | | |
|---|---|---|
| *B01J 29/44* | (2006.01) | |
| *B01J 29/46* | (2006.01) | |
| *B01J 29/48* | (2006.01) | |
| B01J 35/40 | (2024.01) | |
| B01J 35/61 | (2024.01) | |
| B01J 35/64 | (2024.01) | |
| B01J 37/04 | (2006.01) | |
| B01J 37/08 | (2006.01) | |

(52) U.S. Cl.
CPC ............... *B01J 29/48* (2013.01); *B01J 35/40* (2024.01); *B01J 35/615* (2024.01); *B01J 35/647* (2024.01); *B01J 37/04* (2013.01); *B01J 37/08* (2013.01); *B01J 2229/20* (2013.01); *C10G 2300/1033* (2013.01); *C10G 2300/308* (2013.01); *C10G 2300/70* (2013.01); *C10G 2400/20* (2013.01); *C10G 2400/30* (2013.01)

(56) References Cited

U.S. PATENT DOCUMENTS

| | | | |
|---|---|---|---|
| 11,807,816 B2* | 11/2023 | Al-Majnouni | ............ C07C 4/06 |
| 2004/0014593 A1* | 1/2004 | Le Van Mao | ........ B01J 37/0009 |
| | | | 502/64 |
| 2012/0122662 A1 | 5/2012 | Khanmamedova et al. | |
| 2014/0148632 A1* | 5/2014 | Mehlberg | ................. B01J 35/19 |
| | | | 585/653 |
| 2015/0165427 A1* | 6/2015 | Awayssa | ................ B01J 29/084 |
| | | | 502/67 |
| 2018/0237702 A1* | 8/2018 | Akah | ...................... B01J 29/084 |
| 2022/0064556 A1* | 3/2022 | Akah | ...................... C10G 51/06 |
| 2022/0098493 A1 | 3/2022 | Akah et al. | |

FOREIGN PATENT DOCUMENTS

| | | | |
|---|---|---|---|
| EP | 0435412 | * | 3/1996 |
| WO | 2022005544 A1 | | 1/2022 |

OTHER PUBLICATIONS

Barghi et al., "Modeling of ZnZSM-5 deactivation during liquefied petroleum gas catalytic crackign in the presence of steam", Reac Kinet Mech Cat, DOI 10.1007/s11144-016-1126-2, Jan. 5, 2017, 22 pages.
Chenxi et al., "Effect of Ce-modified Fe/ZSM-5 zeolite for selective catalytic reduction of NOx by ammonia", E3S Web of Conferences, vol. 218, No. 03032, 2020.
Corma et al., "Steam catalytic cracking of naphtha over ZSM-5 zeolite for production of propene and ethene: Micro and macroscopic implications of the presence of steam", Applied Catalysis A: General, vol. 417-418, pp. 220-235, 2012.
Corma et al., "IM-5 zeolite for steam catalytic cracking of naphtha to produce propene and ethene. An alternative to ZSM-5 zeolite", Applied Catalysis A: General, vol. 460-461, pp. 106-115, 2013.
Dharia et al., "Catalytic Cracking for Integration of Refinery and Steam Crackers", Advances in Fluid Catalytic Cracking, Characterization & Environmntal Regulations, Occelli, M, Ed. CRC Press, New York, pp. 119-126, 2010.
Firmansyah et al., "Synthesis and characterization of fibrous silica ZSM-5 for cumene hydrocracking", Catalysis Science & Technology, vol. 6, pp. 5178-5182, 2016.
Fumoto et al., "Catalytic Cracking of Heavy Oil with Iron Oxide-based Catalysts Using Hydrogen and Oxygen Species from Steam", Journal of the Japan Petroleum Institute, vol. 58, No. 5, pp. 329-335, 2015.
Fumoto et al., "Iron Oxide Based Catalyst for Catalytic Cracking of Heavy Oil", Iron Ores and Iron Oxide Materials, Ed. V. Shatokha, IntechOpen, London, pp. 93-110, 2018.
Genquan et al., "Research and Commercial Application of CPP Technology for Producing Light Olefins from Heavy Oil", China Petroleum Processing and Petrochemical Technology, vol. 15, No. 3, pp. 7-12, Sep. 30, 2013.
Ghashghaee et al., "Steam catalytic cracking of fuel oil over a novel composite nanocatalyst: Characterizatoin, kinetics and comparative perspecive", Journal of Analytical and Applied Pyrolysis, vol. 138, pp. 281-293, 2019.
Gugel, "Executive Viewpoint: Introducing the refinery of the future":, Hydrocarbon Processing, March, issue No. 3, pp. 12-17, 2019.
Hambali et al., "Unique structure of fibrous ZSM-5 catalyst expedited prolonged hydrogen atom restoration for selective production of propylene from methanol", International Journal of Hydrogen Energy, vol. 46, pp. 24652-24665, 2021.
Lee, "The Growth Area That Refiners Will Need", Petrochemicals, Presented at the Asian Petrochemical Industry Conference (APIC), Taipei, May 2019.
Meng et al., "Studies on catalytic pyrolysis of heavy oils: Reaction behaviors and mechanistic pathways", Applied Catalysis A: General, vol. 294, pp. 168-176, 2005.
Mohiuddin et al., "Catalytic cracking of naphtha: The effect of Fe and Cr impregnated ZSM-5 on olefin selectivity", Applied Petrochemical Research, vol. 8, pp. 119-129, 2018.
Mukherjee, "KBR Olefins Technology—Technology options to meet uncertain market conditions", Presented at the 4th Petrochemicals Conclave, Delhi, Feb. 12, 2015.
Tallman, "Consider new catalytic routes for olefins production", Eng, Hydrocarbon Proc. 87 (4) pp. 95-101, 2008.
Yao, et al., "Preparation of Ce—Mn/Fe2O3 Catalysts for Steam Catalytic Cracking of Coal Tar", Energy Technology & Environmental Science, Chemistry Select, vol. 3, pp. 12537-12543, 2018.
Qureshi et al., "Steam catalytic cracking of crude oil over novel hierarchical zeolite-containing mesoporous silica-alumina core-shell catalysts", https://ssrn.com/abstract=4129096, Jun. 6, 2022.
Notification of Transmittal of the International Search Report and the Written Opinion of the International Searching Authority, or the Declaration dated Jun. 6, 2024 pertaining to International application No. PCT/US2024/019057 filed Mar. 8, 2024, pp. 1-14.
Brosius, Roald "Selective Formation of Linear Alkanes from n-Hexadecane Primary Hydrocracking in Shape-Selective MFI Zeolites by Competitive Adsorption of Water", ACS Catalysis, vol. 6, No. 11, Nov. 4, 2016 (Nov. 4, 2016), pp. 7710-7715.
Auepattana-Aumrung, Chanon "Observation of reduction on alkane products in butene cracking over ZSM-5 modified with Fe, Cu, and Ni catalysts", Fuel, vol. 291, May 1, 2021 (May 1, 2021), 120265, pp. 1-11.

* cited by examiner

MODIFIED ZSM-5 FOR STEAM ENHANCED CATALYTIC CRACKING OF CRUDE OIL TO LIGHT OLEFINS AND AROMATICS

BACKGROUND

Field

The present disclosure relates to processes and catalysts for processing hydrocarbon materials and, in particular, processes and cracking catalyst compositions for steam enhanced catalytically cracking of crude oil to produce olefins, aromatic compounds, or both.

Technical Background

The worldwide increasing demand for greater value petrochemical products and chemical intermediates remains a major challenge for many integrated refineries. In particular, the production of some valuable light olefins, such as ethylene and propylene, has attracted increased attention as pure olefin streams are considered the building blocks for polymer synthesis. Additionally, light aromatic compounds, such as benzene, toluene, and mixed xylenes can be useful as fuel blending constituents or can be converted to greater value chemical products and intermediates, which can be used as building blocks in chemical synthesis processes. Petrochemical feeds, such as crude oils, can be converted to petrochemicals, such as fuel blending components and chemical products and intermediates, such as light olefins and aromatic compounds, which are basic intermediates for a large portion of the petrochemical industry. Crude oil is conventionally processed by distillation followed by various reforming, solvent treatments, and hydroconversion processes to produce a desired slate of fuels, lubricating oil products, chemicals, chemical feedstocks, and the like. Conventional refinery systems generally combine multiple complex refinery units with petrochemical plants to produce greater value petrochemical products and intermediates.

SUMMARY

Accordingly, there is an ongoing need for cracking catalysts and processes for steam enhanced catalytic cracking of crude oil feeds and other hydrocarbon feeds to produce greater yields of light olefins, light aromatic compounds, or both. The present disclosure is directed to processes for upgrading a hydrocarbon feed. The processes include contacting the hydrocarbon feed with steam in the presence of a cracking catalyst composition at reaction conditions sufficient to cause at least a portion of hydrocarbons in the hydrocarbon feed to undergo one or more cracking reactions to produce a steam catalytic cracking effluent comprising light olefins, light aromatic compounds, or both. The cracking catalyst composition includes a cracking additive comprising metal species impregnated on a ZSM-5 zeolite, where the metal species comprises a metal selected from the group consisting of chromium, vanadium, iron, platinum, molybdenum, cerium, and nickel. In embodiments, the cracking catalyst composition may further include a zeolite catalyst that is separate from and in addition to the cracking additive.

According to one or more aspects of the present disclosure, a process for upgrading a hydrocarbon feed comprises contacting the hydrocarbon feed with steam in the presence of a cracking catalyst composition at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst composition comprises a cracking additive comprising a metal species impregnated on a ZSM-5 zeolite, where the metal species comprises a metal selected from the group consisting of chromium, vanadium, iron, platinum, molybdenum, cerium, and nickel.

According one or more other aspects of the present disclosure, a cracking catalyst composition for upgrading a hydrocarbon feed comprises a zeolite catalyst, and a cracking additive comprising a metal species impregnated on a ZSM-5 zeolite, where the metal species comprises a metal selected from the group consisting of chromium, vanadium, iron, platinum, molybdenum, cerium, and nickel.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description of the present disclosure may be better understood when read in conjunction with the following drawings in which.

Figure 1:
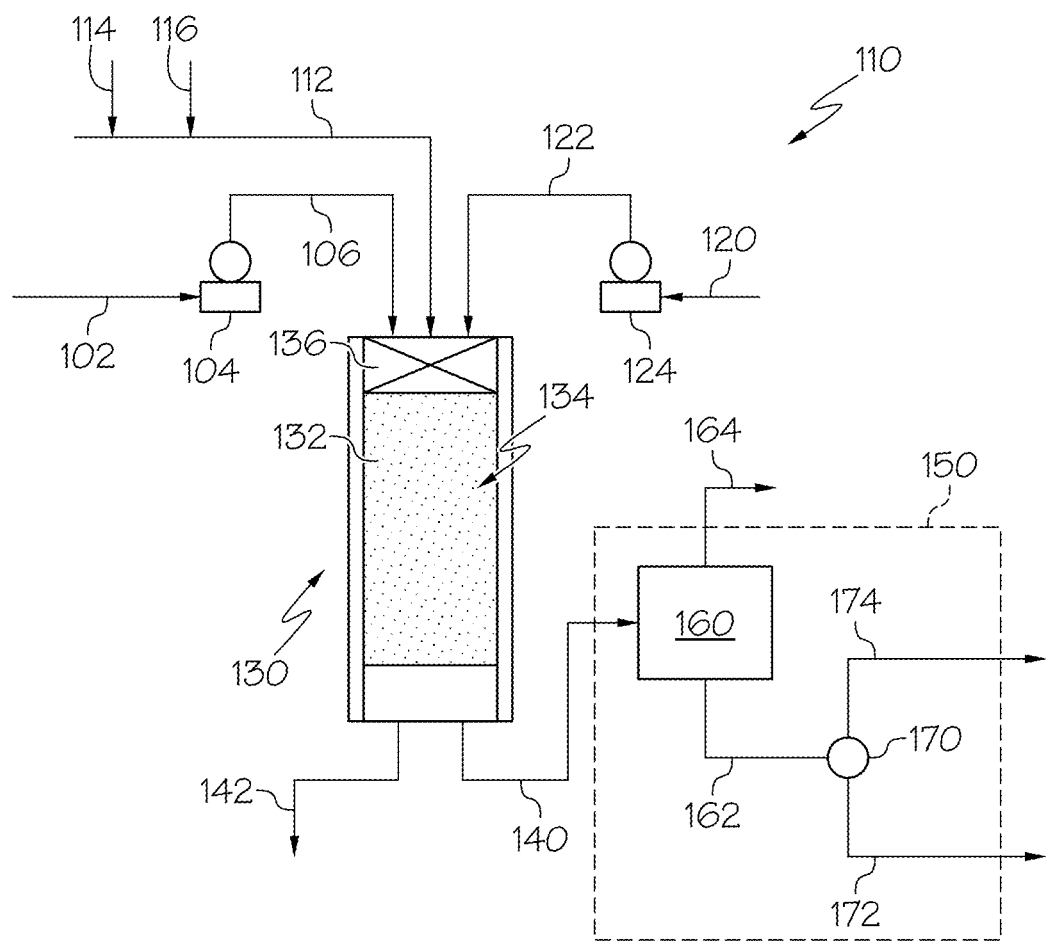
FIG. 1 schematically depicts a generalized flow diagram of a fixed bed reactor system for steam catalytic cracking of crude oil to produce light olefins and light aromatic compounds, according to one or more embodiments shown and described in the present disclosure.
Figure 6:
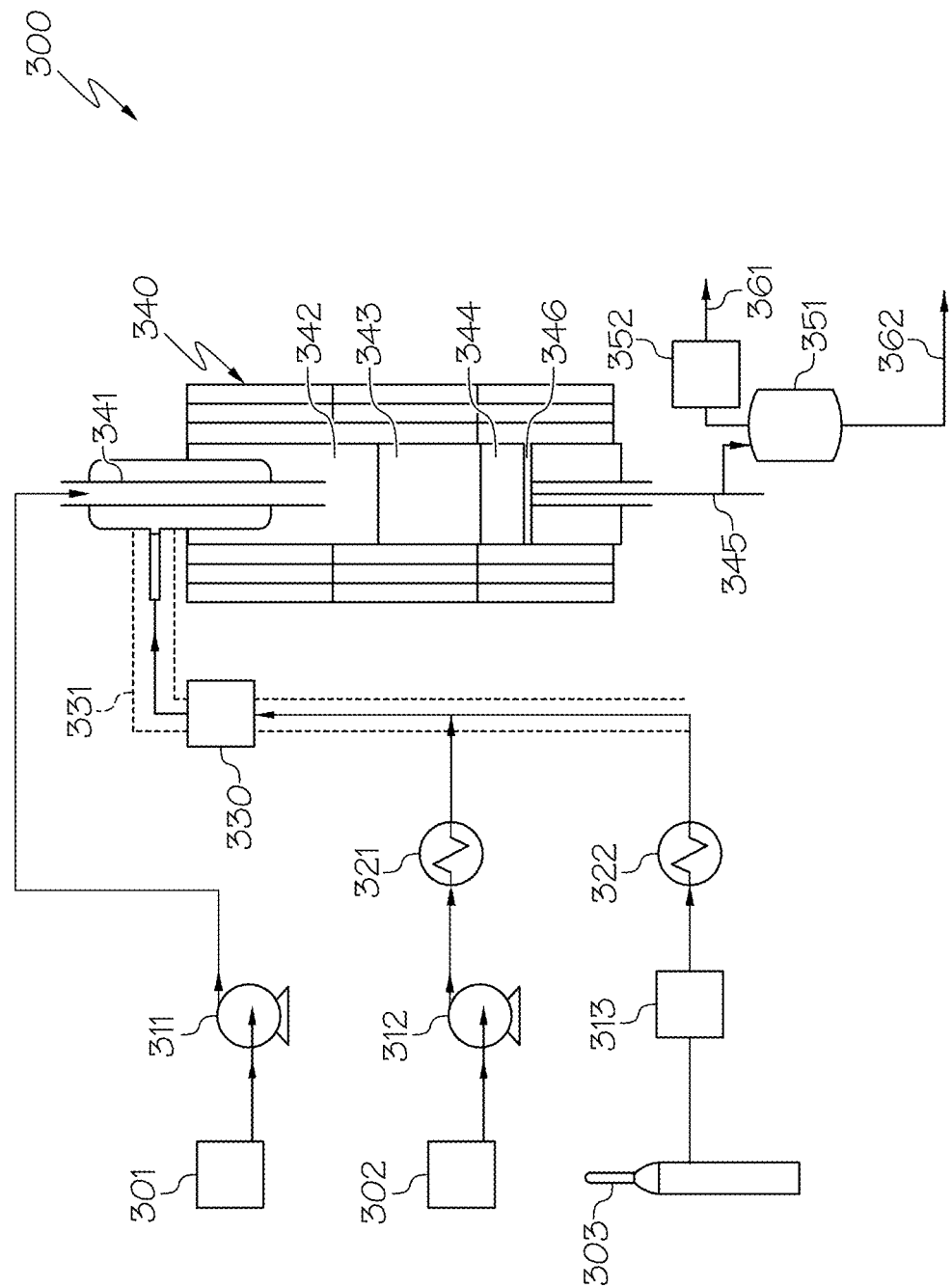
FIG. 6 schematically depicts a generalized flow diagram of a fixed bed reactor system for evaluating the cracking catalyst compositions of Examples 10-16, according to one or more embodiments shown and described in the present disclosure.

When describing the simplified schematic illustrations of FIGS. 1 and 6 the numerous valves, temperature sensors, electronic controllers, and the like, which may be used and are well known to a person of ordinary skill in the art, may not be included. Further, accompanying components that are often included in systems such as those depicted in FIGS. 1 and 6, such as air supplies, heat exchangers, surge tanks, and the like also may not be included. However, a person of ordinary skill in the art understands that these components are within the scope of the present disclosure.

Additionally, the arrows in the simplified schematic illustrations of FIGS. 1 and 6 refer to process streams. However, the arrows may equivalently refer to transfer lines, which may transfer process streams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of FIGS. 1 and 6 may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Reference will now be made in greater detail to various aspects, some of which are illustrated in the accompanying drawings.

DETAILED DESCRIPTION

The present disclosure is directed to cracking catalyst compositions and processes for steam enhanced catalytic cracking of crude oil to produce greater yields of light olefins, light aromatic compounds, or both. The processes of the present disclosure for upgrading a hydrocarbon feed include contacting the hydrocarbon feed with steam in the presence of a cracking catalyst composition in a steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both. The cracking catalyst composition comprises a cracking additive comprising metal species impregnated on a ZSM-5 zeolite, where the metal species comprises a metal selected from the group consisting of chromium, vanadium, iron, platinum, molybdenum, cerium, and nickel. In embodiments, the cracking catalyst composition may further include a zeolite catalyst in combination with the cracking additive and different from the cracking additive.

The cracking additive may be prepared by a method including preparing a zeolite mixture comprising the ZSM-5 zeolite and water; while mixing the zeolite mixture, adding a metal precursor mixture to the zeolite mixture to produce a combined mixture, where the metal precursor mixture comprises a metal species precursor and water; stirring the combined mixture at a temperature of from 10 Celsius (° C.) to 30° C. for a mixing time of from 1 hour to 5 hours; heating the combined mixture to an evaporation temperature of from 30° C. to less than 100° C. while stirring; and maintaining the combined mixture at the evaporation temperature for a period of time from 1 hours to 24 hours, while stirring. Maintaining the combined mixture at the evaporation temperature while mixing may cause water to slowly evaporate from the combined mixture to produce solid particles. Slowly evaporating the water from the combined mixture while mixing may disperse the metal species precursor over the surfaces of the ZSM-5 zeolite. The method may further include calcining the solid particles at a temperature of from 400° C. to 800° C. for 1 hour to 12 hours to produce the cracking additive. The method of making the cracking additive may cause the metal species to be dispersed to a greater extent across the surfaces of the ZSM-5 zeolite compared to other conventional methods of impregnating metals or metal oxides on the surfaces of zeolites. The cracking additive having a greater dispersion of the metal species over the surfaces of the ZSM-5 zeolite may increase the conversion of crude oil from steam enhanced catalytic cracking and may increase the yield of light olefins, light aromatic compounds, or both compared to other commercially available catalysts.

As used in the present disclosure, the term "cracking" refers to a chemical reaction where a molecule having carbon-carbon bonds is broken into more than one molecule by the breaking of one or more of the carbon-carbon bonds or a cyclic molecule having carbon-carbon bonds is converted to a non-cyclic molecule by the breaking or one or more of the carbon-carbon bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

As used in the present disclosure, the term "catalyst" refers to any substance that increases the rate of a specific chemical reaction, such as but not limited to cracking reactions.

As used in the present disclosure, the term "used catalyst" refers to catalyst that has been contacted with reactants at reaction conditions, but has not been regenerated in a regenerator or through a regeneration process. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "regenerated catalyst" refers to catalyst that has been contacted with reactants at reaction conditions and then regenerated in a regenerator or regenerated through an in-place regeneration process to heat the catalyst to a greater temperature, oxidize and remove at least a portion of the coke or other organic contaminants from the catalyst to restore at least a portion of the catalytic activity of the catalyst, or both. The "regenerated catalyst" may have less coke or organic contaminants, a greater temperature, or both, compared to a used catalyst and may have greater catalytic activity compared to used catalyst. The "regenerated catalyst" may have more coke and reduced catalytic activity compared to fresh catalyst that has not been contacted with reactants in a cracking reaction zone and then regenerated.

As used throughout the present disclosure, the terms "butenes" or "mixed butenes" are used interchangeably and refer to combinations of one or a plurality of isobutene, 1-butene, trans-2-butene, or cis-2-butene. As used throughout the present disclosure, the term "normal butenes" refers to a combination of one or a plurality of 1-butene, trans-2-butene, or cis-2-butene. As used throughout the present disclosure, the term "2-butenes" refers to trans-2-butene, cis-2-butene, or a combinations of these.

As used in this disclosure, the term "initial boiling point" or "IBP" of a composition refers to the temperature at which the constituents of the composition with the least boiling point temperatures begin to transition from the liquid phase to the vapor phase. As used in this disclosure, the term "end boiling point" or "EBP" of a composition refers to the temperature at which the greatest boiling temperature constituents of the composition transition from the liquid phase to the vapor phase. A hydrocarbon mixture may be characterized by a distillation profile expressed as boiling point temperatures at which a specific weight percentage of the composition has transitioned from the liquid phase to the vapor phase.

As used in this disclosure, the term "atmospheric boiling point temperature" refers to the boiling point temperature of a compound at atmospheric pressure.

As used in this disclosure, the term "crude oil" or "whole crude oil" is to be understood to mean a mixture of petroleum liquids, gases, or combinations of liquids and gases, including, in some embodiments, impurities such as but not limited to sulfur-containing compounds, nitrogen-containing compounds, and metal compounds, that have not undergone significant separation or reaction processes. Crude oils are distinguished from fractions of crude oil, which are obtained through fractionation of the crude oil through distillation. In embodiments, the crude oil feedstock may be a minimally treated light crude oil to provide a crude oil feedstock having total metals (Ni+V) content of less than 5 parts per million by weight (ppmw) and Conradson carbon residue of less than 5 wt. %.

As used in the present disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in the present disclosure, the terms "downstream" and "upstream" refer to the positioning of components or unit operations of the processing system relative to a direction of flow of materials through the processing system. For example, a second component is considered "downstream" of a first component if materials flowing through the processing system encounter the first component before encountering the second component. Likewise, the first component is considered "upstream" of the second component if the materials flowing through the processing system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed, unless otherwise stated. For example, a slipstream or bleed stream may carry some of the effluent away, meaning that only a portion of the effluent may enter the downstream component or system. The terms "reaction effluent" and "reactor effluent" particularly refer to a stream that is passed out of a reactor or a reaction zone.

As used in the present disclosure, the term "residence time" refers to the amount of time that reactants are in contact with a catalyst, at reaction conditions, such as at the reaction temperature.

As used in the present disclosure, the term "reactor" refers to any vessel, container, conduit, or the like, in which one or more chemical reactions, such as but not limited catalytic cracking reactions, may occur between one or more reactants optionally in the presence of one or more catalysts. One or more "reaction zones" may be disposed within a reactor. The term "reaction zone" refers to a volume where a particular chemical reaction takes place in a reactor.

As used in the present disclosure, the terms "separation unit" and "separator" refer to any separation device or collection of separation devices that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

It should further be understood that streams may be named for the components of the stream, and the component for which the stream is named may be the major constituent of the stream (such as the constituent comprising the greatest fraction of the stream, excluding inert diluent gases, such as nitrogen, noble gases, and the like unless otherwise stated). It should also be understood that components of a stream are disclosed as passing from one system component to another when a stream comprising that component is disclosed as passing from that system component to another. For example, a disclosed "hydrocarbon stream" passing to a first system component or from a first system component to a second system component should be understood to equivalently disclose "hydrocarbons" passing to the first system component or passing from a first system component to a second system component.

Conventional refinery systems include multiple unit operations to convert crude oil and other heavy hydrocarbon streams to greater value products and intermediates, such as light olefins, light aromatic compounds, or combinations of these. Steam enhanced catalytic cracking of crude oil directly can reduce the complexity of the refining process, such as by reducing the number of unit operations needed to process the crude oil. Steam enhanced catalytic cracking often comprises contacting the hydrocarbon feed with steam in the presence of a mordenite framework inverted (MFI) structured zeolite, such as ZSM-5 zeolite. Steam enhanced catalytic cracking using ZSM-5 zeolites may have lower than the desired selectivity to the olefins.

The present disclosure is directed to steam catalytic cracking of crude oil using a cracking catalyst composition comprising a cracking additive comprising a metal species impregnated on a ZSM-5 zeolite to convert hydrocarbons in the crude oil to greater value hydrocarbon products, such as but not limited to light olefins, light aromatic compounds, or combinations of these. In embodiments, the cracking catalyst compositions may also include a zeolite catalyst different from and in addition to the cracking additive. The cracking additives of the present disclosure have greater dispersion of the metal species across the surfaces of the ZSM-5 zeolites compared to catalysts prepared by other methods. Thus, the cracking additives of the present disclosure may improve selectivity of light olefins (such as ethylene, propylene, butenes, or combinations of these), light aromatic compounds, or both compared to steam enhanced catalytic cracking of crude oil using a ZSM-5 zeolite without the metal species with a zeolite catalyst without the cracking additive. The present disclosure is also directed to the cracking catalyst compositions comprising the cracking additives comprising metal species impregnated on the ZSM-5 zeolite and methods of making the cracking additives comprising a cracking additive comprising the metal species impregnated on the ZSM-5 zeolite.

Referring now to FIG. 1, a process of the present disclosure for converting a hydrocarbon feed 102 to light olefins, light aromatic compounds, or both, includes contacting the hydrocarbon feed 102 with steam in the presence of the cracking catalyst composition 132 at reaction conditions sufficient to cause at least a portion of hydrocarbons in the hydrocarbon feed 102 to undergo one or more cracking reactions to produce a steam catalytic cracking effluent 140 comprising light olefins, light aromatic compounds, or both, where the cracking catalyst composition 132 comprises the cracking additive having the metal species impregnated on the ZSM-5 zeolite. In embodiments, the cracking catalyst composition 132 may further include a zeolite catalyst, such as but not limited to an equilibrium catalyst, that is different from and in addition to the cracking additive.

The hydrocarbon feed 102 may include one or more heavy oils, such as but not limited to crude oil, bitumen, oil sand, shale oil, coal liquids, vacuum residue, tar sands, other heavy oil streams, or combinations of these. It should be understood that, as used in this disclosure, a "heavy oil" refers to a raw hydrocarbon, such as whole crude oil, which has not been previously processed through distillation, or may refer to a hydrocarbon oil, which has undergone some degree of processing prior to being introduced to the process as the hydrocarbon feed 102. The hydrocarbon feed 102 may have a density of greater than or equal to 0.80 grams per milliliter. The hydrocarbon feed 102 may have an end boiling point (EBP) of greater than 565° C. The hydrocarbon feed 102 may have a concentration of nitrogen of less than or equal to 3000 parts per million by weight (ppmw).

In embodiments, the hydrocarbon feed 102 may be a crude oil, such as whole crude oil, or synthetic crude oil. The crude oil may have an American Petroleum Institute (API) gravity of from 22 degrees to 50 degrees, such as from 22 degrees to 40 degrees, from 25 degrees to 50 degrees, or from 25 degrees to 40 degrees. For example, the hydrocarbon feed 102 may include an extra light crude oil, a light crude oil, a medium crude oil, a heavy crude oil, or combinations of these. In embodiments, the hydrocarbon feed 102 can be a light crude oil, such as but not limited to an Arab light export crude oil. Example properties for an exemplary grade of Arab light (AL) crude oil are provided in Table 1.

TABLE 1

Example of AL Export Feedstock

| Analysis | Units | Value | Test Method |
| --- | --- | --- | --- |
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil.

In embodiments, the hydrocarbon feed 102 may be an Arab Extra Light (AXL) crude oil. An example boiling point distribution for an exemplary grade of an AXL crude oil is provided in Table 2.

TABLE 2

Example of AXL feedstock

| Property | Units | Value | Test Method |
|---|---|---|---|
| 0.1% Boiling Point (BP) | °C. | 21 | ASTM D7169 |
| 5% BP | °C. | 65 | ASTM D7169 |
| 10% BP | °C. | 96 | ASTM D7169 |
| 15% BP | °C. | 117 | ASTM D7169 |
| 20% BP | °C. | 141 | ASTM D7169 |
| 25% BP | °C. | 159 | ASTM D7169 |
| 30% BP | °C. | 175 | ASTM D7169 |
| 35% BP | °C. | 196 | ASTM D7169 |
| 40% BP | °C. | 216 | ASTM D7169 |
| 45% BP | °C. | 239 | ASTM D7169 |
| 50% BP | °C. | 263 | ASTM D7169 |
| 55% BP | °C. | 285 | ASTM D7169 |
| 60% BP | °C. | 308 | ASTM D7169 |
| 65% BP | °C. | 331 | ASTM D7169 |
| 70% BP | °C. | 357 | ASTM D7169 |
| 75% BP | °C. | 384 | ASTM D7169 |
| 80% BP | °C. | 415 | ASTM D7169 |
| 85% BP | °C. | 447 | ASTM D7169 |
| 90% BP | °C. | 486 | ASTM D7169 |
| 95% BP | °C. | 537 | ASTM D7169 |
| End Boiling Point (EBP) | °C. | 618 | ASTM D7169 |

When the hydrocarbon feed 102 comprises a crude oil, the crude oil may be a whole crude or may be a crude oil that has undergone at least some processing, such as desalting, solids separation, scrubbing, or other process that does not change the composition of the hydrocarbons of the crude oil. For example, the hydrocarbon feed 102 may be a de-salted crude oil that has been subjected to a de-salting process. In embodiments, the hydrocarbon feed 102 may include a crude oil that has not undergone pretreatment, separation (such as distillation), or other operation or process that changes the hydrocarbon composition of the crude oil prior to introducing the crude oil to the system 100.

In embodiments, the hydrocarbon feed 102 can be a crude oil having a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperatures at which a given weight percentage of the hydrocarbon feed stream boils. In embodiments, the crude oil may have one or more of a 5 wt. % boiling temperature of less than or equal to 150° C., a 25 wt. % boiling temperature of less than or equal to 225° C. or less than or equal to 200° C., a 50 wt. % boiling temperature of less than or equal to 500° C., less than or equal 450° C., or less than or equal to 400° C., a 75 wt. % boiling temperature of less than 600° C., less than or equal to 550° C., a 95 wt. % boiling temperature of greater than or equal to 550° C. or greater than or equal to 600° C., or combinations of these. In embodiments, the crude oil may have one or more of a 5 wt. % boiling temperature of from 0° C. to 100° C., a 25 wt. % boiling temperature of from 150° C. to 250° C., a 50 wt. % boiling temperature of from 250° C. to 400° C., a 75 wt. % boiling temperature of from 350° C. to 600° C. and an end boiling point temperature of from 500° C. to 1000° C., such as from 500° C. to 800° C.

Referring again to FIG. 1, one embodiment of a steam catalytic cracking system 110 for steam catalytic cracking a hydrocarbon feed 102 is schematically depicted. The steam catalytic cracking system 110 may include at least one steam catalytic cracking reactor 130. The steam catalytic cracking reactor 130 may include one or more fixed bed reactors, fluid bed reactors, batch reactors, fluid catalytic cracking (FCC) reactors, moving bed catalytic cracking reactors, or combinations of these. In embodiments, the steam catalytic cracking reactor 130 may be a fixed bed reactor. In embodiments, the steam catalytic cracking reactor 130 may include a plurality of fixed bed reactors operated in a swing mode. Operation of the steam catalytic cracking reactor 130 will be described herein in the context of a fixed bed reactor. However, it is understood that other types of reactors, such as fluid bed reactors, batch reactors, FCC reactors, or moving bed reactors, may also be used to contact the hydrocarbon feed 102 with steam in the presence of the cracking catalyst composition 132 to conduct the steam catalytic cracking of the process disclosed herein.

The steam catalytic cracking reactor 130 may operate to contact the hydrocarbon feed 102 with steam in the presence of the cracking catalyst composition 132 comprising the cracking additive of the present disclosure to produce a steam catalytic cracking effluent 140 comprising light olefins, light aromatic compounds, or combinations of these. As previously discussed, the steam catalytic cracking reactor 130 may be a fixed bed catalytic cracking reactor that may include the cracking catalyst composition 132 disposed within a steam catalytic cracking zone 134. The steam catalytic cracking reactor 130 may include a porous packing material 136, such as silica carbide packing, upstream of the steam catalytic cracking zone 134. The porous packing material 136 may ensure sufficient heat transfer to the hydrocarbon feed 102 and steam prior to conducting the steam catalytic cracking reaction in the steam catalytic cracking zone 134.

Referring again to FIG. 1, the hydrocarbon feed 102 may be introduced to the steam catalytic cracking reactor 130. In embodiments, the hydrocarbon feed 102 may be introduced directly to the steam catalytic cracking system 110, such as by passing the crude oil of the hydrocarbon feed 102 to the steam catalytic cracking reactor 130 without passing the hydrocarbon feed 102 to any separation system or unit operation that changes the hydrocarbon composition of the hydrocarbon feed 102. In embodiments, the hydrocarbon feed 102 may be processed upstream of the steam catalytic cracking system 110 to remove contaminants, such as but not limited to nitrogen compounds, sulfur-containing compounds, heavy metals, or other contaminants that may reduce the effectiveness of the cracking catalyst composition 132.

The processes disclosed herein can include introducing the hydrocarbon feed 102 to the steam catalytic cracking system 110, such as introducing the hydrocarbon feed 102 to the steam catalytic cracking reactor 130. Introducing the hydrocarbon feed 102 to the steam catalytic cracking reactor 130 may include heating the hydrocarbon feed 102 to a temperature of from 35° C. to 150° C. and then passing the hydrocarbon feed 102 to the steam catalytic cracking reactor 130. In embodiments, the hydrocarbon feed 102 may be heated to a temperature of from 40° C. to 150° C., from 45° C. to 150° C., from 50° C. to 150° C., from 35° C. to 145° C., from 40° C. to 145° C., from 45° C. to 145° C., from 35° C. to 140° C., from 40° C. to 140° C., or from 45° C. to 140° C.

In embodiments, passing the hydrocarbon feed 102 to the steam catalytic cracking reactor 130 may include passing the hydrocarbon feed 102 to a feed pump 104, where the feed pump 104 may increase the pressure of the hydrocarbon feed 102 and convey the hydrocarbon feed 102 to the steam catalytic cracking reactor 130. The flowrate of the feed pump 104 may be adjusted so that the hydrocarbon feed 102 is injected into the steam catalytic cracking reactor 130 at a gas hourly space velocity (GHSV) of greater than or equal to 0.1 per hour ($h^{-1}$) or greater than or equal to 0.25 $h^{-1}$. The hydrocarbon feed 102 may be injected into the steam catalytic cracking reactor 130 at a GHSV of less than or equal to 50 $h^{-1}$, less than or equal to 25 $h^{-1}$, less than or equal to 20 $h^{-1}$, less than or equal to 14 $h^{-1}$, less than or equal to 9 $h^{-1}$, or less than or equal to 5 $h^{-1}$. The hydrocarbon feed 102 may be injected into the steam catalytic cracking reactor 130 at a GHSV of from 0.1 $h^{-1}$ to 50 $h^{-1}$, from 0.1 $h^{-1}$ to 25 $h^{-1}$, from 0.1 $h^{-1}$ to 20 $h^{-1}$, from 0.1 $h^{-1}$ to 14 $h^{-1}$, from 0.1 $h^{-1}$ to 9 $h^{-1}$, from 0.1 $h^{-1}$ to 5 $h^{-1}$, from 0.1 $h^{-1}$ to 4 $h^{-1}$, from 0.25 $h^{-1}$ to 50 $h^{-1}$, from 0.25 $h^{-1}$ to 25 $h^{-1}$, from 0.25 $h^{-1}$ to 20 $h^{-1}$, from 0.25 $h^{-1}$ to 14 $h^{-1}$, from 0.25 $h^{-1}$ to 9 $h^{-1}$, from 0.25 $h^{-1}$ to 5 $h^{-1}$, from 0.25 $h^{-1}$ to 4 $h^{-1}$, from 1 $h^{-1}$ to 50 $h^{-1}$, from 1 $h^{-1}$ to 25 $h^{-1}$, from 1 $h^{-1}$ to 20 $h^{-1}$, from 1 $h^{-1}$ to 14 $h^{-1}$, from 1 $h^{-1}$ to 9 $h^{-1}$, or from 1 $h^{-1}$ to 5 $h^{-1}$ via feed inlet line 106. The hydrocarbon feed 102 may be further pre-heated in the feed inlet line 106 to an inlet temperature of from 100° C. to 250° C. before injecting the hydrocarbon feed 102 into the steam catalytic cracking reactor 130.

Water 120 may be injected into the steam catalytic cracking reactor 130 through water feed line 122 via the water feed pump 124. The water feed line 122 may be pre-heated to heat the water 120 to a temperature of from 50° C. to 175° C., from 50° C. to 150° C., from 60° C. to 175° C., or from 60° C. to 170° C. The water 120 may be converted to steam in water feed line 122 or upon contact with the hydrocarbon feed 102 in the steam catalytic cracking reactor 130. The flowrate of the water feed pump 124 may be adjusted to deliver the water 120 (liquid, steam, or both) to the steam catalytic cracking reactor 130 at a flow rate equivalent to a GHSV of greater than or equal to 0.1 $h^{-1}$, greater than or equal to 0.5 $h^{-1}$, greater than or equal to 1 $h^{-1}$, greater than or equal to 5 $h^{-1}$, greater than or equal to 6 $h^{-1}$, greater than or equal to 10 $h^{-1}$, or even greater than or equal to 15 $h^{-1}$. The water 120 may be introduced to the steam catalytic cracking reactor 130 at a flow rate equivalent to a GHSV of less than or equal to 100 $h^{-1}$, less than or equal to 75 $h^{-1}$, less than or equal to 50 $h^{-1}$, less than or equal to 30 $h^{-1}$, or less than or equal to 20 $h^{-1}$. The water 120 may be introduced to the steam catalytic cracking reactor 130 at a flow rate equivalent to a GHSV of from 0.1 $h^{-1}$ to 100 $h^{-1}$, from 0.1 $h^{-1}$ to 75 $h^{-1}$, from 0.1 $h^{-1}$ to 50 $h^{-1}$, from 0.1 $h^{-1}$ to 30 $h^{-1}$, from 0.1 $h^{-1}$ to 20 $h^{-1}$, from 1 $h^{-1}$ to 100 $h^{-1}$, from 1 $h^{-1}$ to 75 $h^{-1}$, from 1 $h^{-1}$ to 50 $h^{-1}$, from 1 $h^{-1}$ to 30 $h^{-1}$, or from 1 $h^{-1}$ to 20 $h^{-1}$.

The steam from injection of the water 120 into the steam catalytic cracking reactor 130 may reduce the hydrocarbon partial pressure, which may have the dual effects of increasing yields of light olefins (e.g., ethylene, propylene and butylene) as well as reducing coke formation on the cracking catalyst composition 132. Not intending to be limited by any particular theory, it is believed that light olefins like propylene and butenes are mainly generated from catalytic cracking reactions following the carbonium ion mechanism, and as these are intermediate products, they can undergo secondary reactions such as hydrogen transfer and aromatization (leading to coke formation). The steam may increase the yield of light olefins by suppressing these secondary bimolecular reactions, and may reduce the concentration of reactants and products, which favor selectivity towards light olefins. The steam may also suppress secondary reactions that are responsible for coke formation on catalyst surfaces, which is good for the cracking catalyst compositions to maintain high average activation.

The mass flow rate of the water 120 to the steam catalytic cracking reactor 130 may be less than the mass flow rate of the hydrocarbon feed 102 to the steam catalytic cracking reactor 130. In embodiments, a mass flow ratio of the water 120 to the hydrocarbon feed 102 introduced to the steam catalytic cracking reactor 130 can be less than 1, such as less than or equal to 0.9, less than or equal to 0.8, less than or equal to 0.7, or less than or equal to 0.6. In embodiments, the mass flow ratio of the water 120 to the hydrocarbon feed 102 introduced to the steam catalytic cracking reactor 130 can be from 0.2 to less than 1, from 0.2 to 0.9, from 0.2 to 0.8, from 0.2 to 0.7, from 0.2 to 0.6, from 0.3 to less than 1, from 0.3 to 0.9, from 0.3 to 0.8, from 0.3 to 0.7, from 0.3 to 0.6, from 0.4 to less than 1, from 0.4 to 0.9, from 0.4 to 0.8, from 0.4 to 0.7, from 0.4 to 0.6, from 0.5 to less than 1, from 0.5 to 0.9, from 0.5 to 0.8, from 0.5 to 0.7, from 0.5 to 0.6. The mass flow ratio of water to hydrocarbon feed 102 is equal to the mass flow rate of the water 120 to the steam catalytic cracking reactor 130 divided by the mass flow rate of the hydrocarbon feed 102 to the steam catalytic cracking reactor 130. In embodiments, the mass flow ratio of the water 120 to the hydrocarbon feed 102 introduced to the steam catalytic cracking reactor 130 can be about 0.5. The water may be present as steam in the steam catalytic cracking reactor 130.

Referring again to FIG. 1, the steam catalytic cracking system 110 may be operable to contact the hydrocarbon feed 102 with steam (from water 120) in the presence of the cracking catalyst composition 132 in the steam catalytic cracking reactor 130 under reaction conditions sufficient to cause at least a portion of the hydrocarbons from the hydrocarbon feed 102 to undergo one or more cracking reactions to produce a steam catalytic cracking effluent 140 comprising light olefins, light aromatic compounds, or both. In embodiments, the steam catalytic cracking effluent 140 may comprise light olefins, which may include but are not limited to ethylene, propylene, butenes, or combinations of these. In embodiments, the steam catalytic cracking effluent 140 may comprise light aromatic compounds, which refers to compounds containing an aromatic ring structure and having less than or equal to 11 carbon atoms. The light aromatic compounds in the steam catalytic cracking effluent 140 may include but are not limited to benzene, toluene, ethylbenzene, xylenes, or other light aromatic compounds.

The steam catalytic cracking reactor 130 may be operated at a temperature of greater than or equal to 525° C., greater than or equal to 550° C., greater than or equal to 575° C., or even greater than or equal to 600° C. The steam catalytic cracking reactor 130 may be operated at a temperature of less than or equal to 800° C., less than or equal to 750° C., less than or equal to 700° C., or even less than or equal to 675° C. The steam catalytic cracking reactor 130 may be operated at a temperature of from 525° C. to 800° C., from 525° C. to 750° C., from 525° C. to 700° C., from 525° C. to 675° C., from 550° C. to 750° C., from 550° C. to 700° C., from 550° C. to 675° C., from 575° C. to 750° C., from 575° C. to 700° C., from 575° C. to 675° C., from 600° C. to 750° C., from 600° C. to 700° C., or from 600° C. to 675° C. In embodiments, the steam catalytic cracking reactor 130 may be operated at a temperature of about 675° C. In embodiments, the steam catalytic cracking reactor 130 may be operated at a pressure of from 100 kPa to 200 kPa. In embodiments, the process may operate at atmospheric pressure (approximately 101 kilopascals).

The methods of the present disclosure may include contacting the hydrocarbon feed 102 with the steam (water 120) in the presence of the cracking catalyst composition 132 in the steam catalytic cracking reactor 130 for a residence time sufficient to convert at least a portion of the hydrocarbon compounds in the hydrocarbon feed 102 to light olefins, light aromatic compounds, or both. In embodiments, the methods may include contacting the hydrocarbon feed 102 with the steam (water 120) in the presence of the cracking catalyst composition 132 in the steam catalytic cracking reactor 130 for a residence time of from 1 second to 60 seconds, such as from 1 second to 30 seconds, from 1 second to 10 seconds, or about 10 seconds.

When the steam catalytic cracking reactor 130 is a fixed bed reactor, the steam catalytic cracking reactor 130 may be operated in a semi-continuous manner. For example, during a conversion cycle, the steam catalytic cracking reactor 130 may be operated with the hydrocarbon feed 102 and water 120 flowing to the steam catalytic cracking reactor 130 for a period of time. After the period of the time, the cracking catalyst composition 132 may be regenerated. Each conversion cycle of the steam catalytic cracking reactor 130 may be from 2 to 24 hours, from 2 to 20 hours, from 2 to 16 hours, from 2 to 12 hours, from 2 to 10 hours, from 2 to 8 hours, from 4 to 24 hours, from 4 to 20 hours, from 4 to 16 hours, from 4 to 12 hours, from 4 to 10 hours, from or 4 to 8 hours before switching off the feed pump 104 and the water feed pump 124 to cease the flow of hydrocarbon and steam to the steam catalytic cracking reactor 130.

At the end of the conversion cycle, the flow of hydrocarbon feed 102 and water 120 may be stopped and the cracking catalyst composition 132 may be regenerated during a regeneration cycle. In embodiments, the steam catalytic cracking system 110 may include a plurality of fixed bed steam catalytic cracking reactors 130, which may be operated in parallel or in series. In embodiments, the steam catalytic cracking system 110 may include 1, 2, 3, 4, 5, 6, or more than 6 steam catalytic cracking reactors 130, which may be operated in series or in parallel. With a plurality of steam catalytic cracking reactors 130 operating in parallel, one or more of the steam catalytic cracking reactors 130 can continue in a conversion cycle while one or more of the other steam catalytic cracking reactors can be taken off-line for regeneration of the cracking catalyst composition 132, thus maintaining continuous operation of the steam catalytic cracking system 110.

Referring again to FIG. 1, during a regeneration cycle, the steam catalytic cracking reactor 130 may be operated to regenerate the cracking catalyst composition 132 to remove coke deposits accumulated during the conversion cycle. To regenerate the cracking catalyst composition 132, hydrocarbon gas and liquid products produced by the steam catalytic cracking process may be evacuated from the steam catalytic cracking reactor 130. Nitrogen gas may be introduced to the steam catalytic cracking reactor 130 through gas inlet line 112 to evacuate the hydrocarbon gas and liquid products from the fixed bed steam catalytic cracking reactor 130. Nitrogen may be introduced to the steam catalytic cracking reactor 130 at a gas hourly space velocity of from 10 per hour ($h^{-1}$) to 100 $h^{-1}$.

Following evacuation of the hydrocarbon gases and liquids, air may be introduced to the steam catalytic cracking reactor 130 through the gas inlet line 112 at a gas hourly space velocity of from 10 $h^{-1}$ to 100 $h^{-1}$. The air may be passed out of the steam catalytic cracking reactor 130 through air outlet line 142. While passing air through the cracking catalyst composition 132 in the steam catalytic cracking reactor 130, the temperature of the steam catalytic cracking reactor 130 may be increased from the reaction temperature to a regeneration temperature of from 650° C. to 750° C. for a period of from 3 hours to 5 hours. The gas produced by air regeneration of the cracking catalyst composition 132 may be passed out of the steam catalytic cracking reactor 130 and may be analyzed by an in-line gas analyzer to detect the presence or concentration of carbon dioxide produced through de-coking of the cracking catalyst composition 132. Once the carbon dioxide concentration in the gases passing out of the steam catalytic cracking reactor 130 are reduced to less than 0.1% by weight, or even less than 0.05% by weight, as determined by the in-line gas analyzer, the temperature of the steam catalytic cracking reactor 130 may be decreased from the regeneration temperature back to the reaction temperature. The air flow through gas inlet line 112 may be stopped. Nitrogen gas may be passed through the cracking catalyst composition 132 for 15 to 30 μminutes to remove air from the steam catalytic cracking reactor 130. Following treatment with nitrogen, the flows of the hydrocarbon feed 102 and water 120 may be resumed to begin another conversion cycle of steam catalytic cracking reactor 130. Although described herein in the context of a fixed bed reactor system, it is understood that the steam catalytic cracking reactor 130 can be a different type of reactor, such as a fluidized bed reactor, a moving bed reactor, a batch reactor, an FCC reactor, or combinations of these.

Referring again to FIG. 1, the steam catalytic cracking effluent 140 may pass out of the steam catalytic cracking reactor 130. The steam catalytic cracking effluent 140 may include one or more products and intermediates, such as but not limited to fuel gas, such as methane; saturated C2·C4 hydrocarbons; light olefins; naphtha ($C_5$·221° C.), which may include light aromatic compounds; light cycle oil (LCO, 221·343° C.); heavy cycle oil (HCO, +343° C.), such as but not limited to slurry oil; coke; or combinations of these. The light olefins in the steam catalytic cracking effluent 140 may include ethylene, propylene, butenes, or combinations of these. The light aromatic compounds in the steam catalytic cracking effluent 140 may include, but are not limited to benzene, toluene, xylenes, ethylbenzene, and other light aromatic compounds having from 6 to 11 carbon atoms.

As previously discussed, the cracking catalyst composition 132 may comprise, consist of, or consist essentially of a zeolite catalyst and a cracking additive, where the cracking additive is different from the zeolite catalyst. In embodiments, the zeolite catalyst may comprise one or more of Y-type zeolite, USY zeolite, Beta zeolite, mordenite (MOR) structured zeolite, mordenite framework inverted (MFI) zeolite, core-shell composite containing Beta zeolite coated over framework of MFI zeolite, other type of zeolite suitable for catalytically cracking hydrocarbons, or combinations thereof. In embodiments, the zeolite catalyst may include an equilibrium catalyst (ECAT). As used in the present disclosure, the term "equilibrium catalyst" refers to used zeolite catalyst from a fluidized catalytic cracking (FCC) process. In embodiments, the equilibrium catalyst may comprise rare earth metal, Ni, V, or combinations thereof.

In embodiments, an amount of the zeolite catalyst in the cracking catalyst composition may be from 70 wt. % to 80 wt. %, from 72 wt. % to 80 wt. %, from 74 wt. % to 80 wt. %, from 70 wt. % to 78 wt. %, from 72 wt. % to 78 wt. %, from 74 wt. % to 78 wt. %, from 70 wt. % to 76 wt. %, from 72 wt. % to 76 wt. %, or from 74 wt. % to 76 wt. % based on the total amount of the cracking catalyst composition.

The cracking additive comprises, consists of, or consists essentially of a metal species impregnated onto a ZSM-5 zeolite. In embodiments, the ZSM-5 zeolite of the cracking additive may have a molar ratio of silica to alumina of greater than or equal to 10 or greater than or equal to 20. The ZSM-5 zeolite of the cracking additive may have a molar ratio of silica to alumina of less than or equal to 1500, such as less than or equal to 900, less than or equal to 600, or even less than or equal to 300. In embodiments, the ZSM-5 zeolite of the cracking additive may have a molar ratio of silica to alumina of from 10 to 1500, such as from 10 to 900, from 10 to 600, from 10 to 300, from 20 to 1500, from 20 to 900, from 20 to 600, from 20 to 300.

In embodiments, the ZSM-5 zeolite may have an average crystal size of greater than or equal to 150 nanometers (nm), such as from 160 nm to 1000 nm, from 160 nm to 950 nm from 160 nm to 900 nm from 190 nm to 1000 nm, from 190 nm to 950 nm, from 190 nm to 900 nm, from 190 nm to 800 nm, from 190 nm to 700 nm, from 190 nm to 250 nm, from 210 nm to 1000 nm, from 210 nm to 950 nm, from 210 nm to 900 nm, from 210 nm to 800 nm, from 800 nm to 1000 nm, from 900 nm to 1000 nm, or from 900 nm to 950 nm. The average crystal size is determined by scanning electron microscopy (SEM) according to known methods. In embodiments, the ZSM-5 zeolite of the cracking additive may be in the form of a plurality of particles.

As previously discussed, the cracking additive comprises a metal species impregnated onto the ZSM-5 zeolite. In embodiments, the metal species may include a metal or metal oxide. In embodiments, the metal species may comprise a metal selected from chromium, vanadium, iron, platinum, molybdenum, cerium, or nickel. In embodiments, the metal species may include a metal selected from the group consisting of chromium, vanadium, iron, platinum, molybdenum, cerium, and nickel. In embodiments, the cracking additive may include a single metal species comprising a metal selected from the group consisting of chromium, vanadium, iron, platinum, molybdenum, cerium, and nickel.

In embodiments, the metal species may be a metal oxide selected from chromium oxide, vanadium oxide, iron oxide, platinum oxide, molybdenum oxide, cerium oxide, or nickel oxide. In embodiments, the metal species may consist of a metal oxide selected from the group consisting of chromium oxide, vanadium oxide, iron oxide, platinum oxide, molybdenum oxide, cerium oxide, and nickel oxide. In embodiments, the cracking additive may include a single metal oxide selected from the group consisting of chromium oxide, vanadium oxide, iron oxide, platinum oxide, molybdenum oxide, cerium oxide, and nickel oxide.

The cracking additive may include a concentration of the metal species that is sufficient to increase the yield of light olefins, light aromatic compounds, or both from steam catalytic cracking using the cracking additive. In embodiments, the cracking additive may comprise from 0.1 wt. % to 10 wt. %, from 0.1 wt. % to 8 wt. %, from 0.1 wt. % to 5 wt. %, from 1 wt. % to 10 wt. %, from 1 wt. % to 8 wt. %, from 1 wt. % to 5 wt. %, from 2 wt. % to 10 wt. %, from 2 wt. % to 8 wt. %, or from 2 wt. % to 5 wt. % of the metal species, based on the total weight of the cracking additive.

In embodiments, the cracking additive may include the metal species impregnated on the ZSM-5 zeolite without phosphorous. In embodiments, the cracking additive may be substantially free of phosphorous, such as having less than or equal to 0.1 wt. % or less than or equal to 0.01 wt. % phosphorous based on the total weight of the cracking additive.

In embodiments, the cracking additive may include cerium oxide impregnated on the ZSM-5 zeolite, which may have a molar ratio of silica to alumina of 30, and may be essentially free of phosphorous. A concentration of cerium oxide in the cracking additive may be from 0.1 wt. % to 10 wt. %, from 0.1 wt. % to 8 wt. %, from 0.1 wt. % to 5 wt. %, from 1 wt. % to 10 wt. %, from 1 wt. % to 8 wt. %, from 1 wt. % to 5 wt. %, from 2 wt. % to 10 wt. %, from 2 wt. % to 8 wt. %, or from 2 wt. % to 5 wt. %, or about 2 wt. % based on the total weight of the cracking additive. In embodiments, the cracking additive may consist of or consist essentially of cerium oxide impregnated on a ZSM-5 zeolite.

In embodiments, the cracking additive may be in the form of a plurality of particles. In embodiments, the cracking additive may have an average particle size of greater than or equal to 300 μmicrometer (m), such as from 350 μm to 2000 μm, from 350 μm to 1500 μm from 350 μm to 1000 μm, from 400 μm to 2000 μm, from 400 μm to 1500 μm, from 400 μm to 1000 μm, from 450 μm to 2000 μm, from 450 μm to 1500 μm, from 450 μm to 1000 μm, from 500 μm to 2000 μm, from 500 μm to 1500 μm, or from 500 μm to 1000 μm. The average particle size is determined by scanning electron microscopy (SEM) according to known methods.

In embodiments, the cracking additive may have an average surface area of from 200 square meters per gram (m²/g) to 400 μm²/g, from 200 μm²/g to 380 μm²/g, from 200 μm²/g to 370 m²/g, from 250 μm²/g to 400 μm²/g, from 250 μm²/g to 390 μm²/g, from 250 μm²/g to 380 μm²/g, from 250 μm²/g to 370 μm²/g, from 300 μm²/g to 400 μm²/g, from 300 μm²/g to 390 μm²/g, from 300 μm²/g to 380 μm²/g, or from 300 μm²/g to 370 μm²/g. The average surface area is determined according to the Brunauer-Emmett-Teller (BET) method based on nitrogen adsorption at −195° C. performed on an AUTOSORB-1 instrument obtained from Quanta Chrome. The average surface area may be referred to throughout the present disclosure as the BET surface area.

In embodiments, the average pore size of the cracking additive may be the average pore diameter for pores with a generally cylindrical cross-section. The cracking additive may have an average pore diameter of from 3 nanometers (nm) to 10 nm, from 4 nm to 10 nm, from 3 nm to 9 nm, from 4 nm to 9 nm, from 3 nm to 8 nm, or from 4 nm to 8 nm. The average pore diameter of the cracking additive is determined by scanning electron microscopy (SEM) according to known methods.

The cracking additive may have an average pore volume of from 0.05 square centimeter per gram (cm³/g) to 0.5 cm³/g, from 0.06 cm³/g to 0.5 cm³/g, from 0.07 cm³/g to 0.5 cm³/g, from 0.08 cm³/g to 0.5 cm³/g, from 0.09 cm³/g to 0.5 cm³/g, from 0.05 cm³/g to 0.3 cm³/g, from 0.06 cm³/g to 0.3 cm³/g, from 0.07 cm³/g to 0.3 cm³/g, from 0.08 cm³/g to 0.3 cm³/g, from 0.09 cm³/g to 0.3 cm³/g, from 0.05 cm³/g to 0.1 cm³/g, from 0.06 cm³/g to 0.1 cm³/g, from 0.07 cm³/g to 0.1 cm³/g, from 0.08 cm³/g to 0.1 cm³/g, or from 0.09 cm³/g to 0.1 cm³/g. The average pore volume of the cracking additive is determined from measured gas adsorption isotherms through Barrett-Joyner-Halenda Model.

In embodiments, the cracking additive does not include any binders, matrix materials, or other catalytic species supported on the ZSM-5 zeolite except the metal species.

In embodiments, an amount of the cracking additive in the cracking catalyst composition may be from 20 wt. % to 30 wt. %, from 22 wt. % to 30 wt. %, from 24 wt. % to 30 wt. %, from 20 wt. % to 28 wt. %, from 22 wt. % to 28 wt. %, from 24 wt. % to 28 wt. %, from 20 wt. % to 26 wt. %, from 22 wt. % to 26 wt. %, or from 24 wt. % to 26 wt. % based on the total amount of the cracking catalyst composition.

Figure 2:
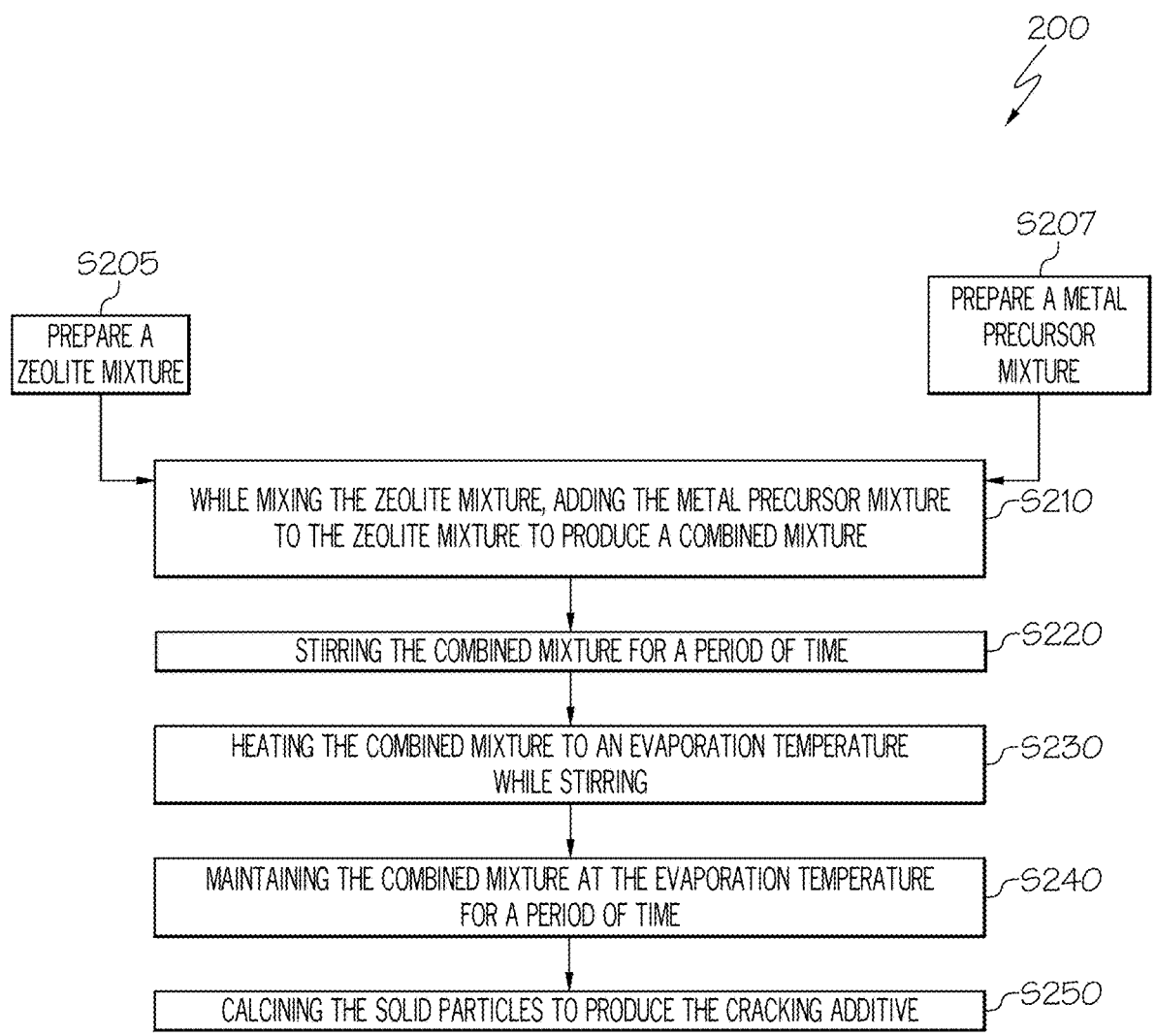
FIG. 2 depicts a flowchart of a process for producing a cracking additive comprising a metal species impregnated on the ZSM-5 zeolite, according to one or more embodiments shown and described in the present disclosure.

Referring now to FIG. 2, a method 200 for preparing the cracking additive may include preparing a zeolite mixture comprising the ZSM-5 zeolite and water, in step S205; preparing a metal precursor mixture comprising a metal precursor and water, in step S207; while mixing the zeolite mixture, adding the metal precursor mixture to the zeolite mixture to produce a combined mixture, in step S210; stirring the combined mixture at a temperature of from 10 Celsius (° C.) to 30° C. for a mixing time of from 1 hour to 5 hours, in step S220; heating the combined mixture to an evaporation temperature of from 30° C. to less than 100° C. while stirring at atmospheric pressure, in step S230; maintaining the combined mixture at the evaporation temperature and atmospheric pressure for a period of time from 1 hours to 24 hours, in step S240; and calcining the solid particles at a temperature of from 400° C. to 800° C. for 1 hour to 12 hours in step 250 to produce the cracking additive.

In step S205 of the method 200, the zeolite mixture comprising the ZSM-5 zeolite and water may be prepared by adding a zeolite powder comprising the ZSM-5 zeolite to water. In embodiments, a concentration of the zeolite powder in the zeolite mixture may be from 10 weight percent (wt. %) to 50 wt. % based on the total weight of the zeolite mixture. In embodiments, a concentration of water in the zeolite mixture may be from 50 wt. % to 90 wt. % based on the total weight of the zeolite mixture. In embodiments, the method 200 for preparing the cracking additive may further include calcining the zeolite powder prior to producing the zeolite mixture. In embodiments, the zeolite powder may be calcined at a temperature of from 400° C. to 800° C., from 400° C. to 600° C., from 500° C. to 800° C., from 500° C. to 600° C., or 550° C. In embodiments, the zeolite powder may be calcined for a time period of from 1 hour to 12 hours, from 1 hour to 10 hours, from 2 hours to 12 hours, from 2 hours to 10 hours, or 8 hours.

In step S207 of the method 200, the metal precursor mixture may be prepared by adding a metal precursor to water and mixing. Preparing the metal precursor mixture in step S207 may be performed in parallel to preparing the zeolite mixture in step S205. In embodiments, a concentration of the metal precursor in the metal precursor mixture may be from 0.1 wt. % to 10 wt. % based on the total weight of the metal precursor mixture. In embodiments, a concentration of water in the metal precursor mixture may be from 90 wt. % to 99.9 wt. % based on the total weight of the metal precursor mixture. The metal precursor may include chromium(III) nitrate nonahydrate ($Cr(NO_3)_3 \cdot 9H_2O$), ammonium vanadate ($NH_4VO_3$), iron(III) nitrate nonahydrate ($Fe(NO_3)_3 \cdot 9H_2O$), tetra-ammine-platinum(II) nitrate ($Pt(NH_3)_4(NO_3)_2$), ammonium heptamolybdate tetrahydrate (($NH_4)_6Mo_7O_{24} \cdot 4H_2O$), cerium(III) nitrate hexahydrate ($Ce(NO_3)_3 \cdot 6H_2O$), or nickel nitrate hexahydrate ($Ni(NO_3)_2 \cdot 6H_2O$). In embodiments, the metal precursor may include only one of chromium(III) nitrate nonahydrate ($Cr(NO_3)_3 \cdot 9H_2O$), ammonium vanadate ($NH_4VO_3$), iron(III) nitrate nonahydrate ($Fe(NO_3)_3 \cdot 9H_2O$), tetra-ammine-platinum(II) nitrate ($Pt(NH_3)_4(NO_3)_2$), ammonium heptamolybdate tetrahydrate (($NH_4)_6Mo_7O_{24} \cdot 4H_2O$), cerium(III) nitrate hexahydrate ($Ce(NO_3)_3 \cdot 6H_2O$), or nickel nitrate hexahydrate ($Ni(NO_3)_2 \cdot 6H_2O$).

In step S210 of the method 200, the metal precursor mixture may be added to the zeolite mixture while agitating the zeolite mixture. Adding the metal precursor mixture to the zeolite mixture while agitating the zeolite mixture may include one or more of stirring, swirling, vortexing, shaking, sonicating, homogenizing, blending, or the like. In embodiments, the metal precursor mixture may be added to the zeolite mixture at a rate of from 0.1 μmilliliters per minute (mL/min) to 1.0 μmL/min.

In step S220 of the method 200, the combined mixture may be stirred, which may disperse the metal precursor and ZSM-5 zeolite throughout the combined mixture. In embodiments, the combined mixture may be stirred at a temperature of from 10° C. to 30° C., from 10° C. to 25° C., from 15° C. to 30° C., or from 15° C. to 25° C. The combined mixture may be stirred for a period of time sufficient to produce a homogeneous combined mixture. In embodiments, the combined mixture may be stirred for 1 hour to 5 hours, 1 hour to 4 hours, 2 hours to 5 hours, 2 hours to 4 hours, or 3 hours. Not intending to be bound by any particular theory, it is believed that stirring or mixing the combined mixture for a period of time before removing water from the combined mixture may result in greater dispersion of the metal species over the surfaces of the ZSM-5 zeolite, such as by allowing the metal precursors to permeate into the pores of the ZSM-5 zeolite before removing water from the combined mixture.

In step S230 of the method 200, the combined mixture may be heated to an evaporation temperature. The evaporation temperature may be less than the boiling point of water at the pressure at which the heating is conducted, such as less than 100° C. at atmospheric pressure. In embodiments, evaporation temperature may be from 10° C. to less than 100° C., from 10° C. to 90° C., from 10° C. to 80° C., from 10° C. to 70° C., from 10° C. to 60° C., from 20° C. to less than 100° C., from 20° C. to 90° C., from 20° C. to 80° C., from 20° C. to 70° C., from 20° C. to 60° C., from 30° C. to less than 100° C., from 30° C. to 90° C., from 30° C. to 80° C., from 30° C. to 70° C., from 30° C. to 60° C., from 40° C. to less than 100° C., from 40° C. to 90° C., from 40° C. to 80° C., from 40° C. to 70° C., from 40° C. to 60° C., or 50° C. at atmospheric pressure. The evaporation temperature may be greater than 100° C. as long as the pressure is adjusted accordingly to maintain the combined mixture below the boiling point of water.

In step S240 of the method 200, the combined mixture may be maintained at the evaporation temperature and pressure for a period of time from 1 hours to 24 hours, while stirring. In step S240 of the method 200, the combined mixture may be maintained at the evaporation temperature and pressure while mixing, which may cause water to slowly evaporate from the combined mixture to produce solid particles. In step S240 of the method 200, the water may be slowly evaporated from the combined mixture while the mixing disperses the metal species precursor over the surfaces of the ZSM-5 zeolite. In embodiments, the combined mixture may be maintained at the evaporation temperature and pressure for a time period of from 1 hour to 24 hours, from 1 hour to 20 hours, from 1 hour to 16 hours, from 2 hours to 24 hours, from 2 hours to 20 hours, from 2 hours to 16 hours, from 5 hours to 24 hours, from 5 hours to 20 hours, from 5 hours to 16 hours, from 2 hours to 24 hours, from 8 hours to 20 hours, from 8 hours to 16 hours, 12 hours. Evaporating water from the combined mixture at the evaporation temperature, such as at 30° C. to 100° C. at atmospheric pressure, for a time period of from 1 hour to 24 hours may result in a water evaporation rate of from 1.0 grams per minute (g/min) to 10.0 g/min. Not intending to be bound by any particular theory, it is believed that slowly removing water from the combined mixture through evaporation at temperatures less than the boiling point temperature of water at a given pressure may further improve the dispersion of the metal species over the surfaces of the ZSM-5 zeolite.

In embodiments, the method 200 for preparing the cracking additive may further include drying the solid particles at a temperature of from 50° C. to 200° C. (not shown in FIG. 2). In embodiments, the solid particles may be dried at a temperature of from 50° C. to 200° C., from 50° C. to 100°

C., from 70° C. to 200° C., from 70° C. to 100° C., or 90° C. In embodiments, the solid particles may be dried overnight.

In step S250 of method 200, following drying, the solid particles may be calcined at a temperature of from 400° C. to 800° C. for from 1 hour to 12 hours to produce the cracking additive. In embodiments, the solid particles may be calcined at a temperature of from 400° C. to 800° C., from 400° C. to 600° C., from 500° C. to 800° C., from 500° C. to 600° C., or about 550° C. In embodiments, the solid particles may be calcined at a time period of from 1 hour to 12 hours, from 1 hour to 10 hours, from 2 hours to 12 hours, from 2 hours to 10 hours, or 8 hours.

In embodiments, the cracking additive can be ion-exchanged to produce the hydrogen form of the cracking additive. In hydrogen form, the Brønsted acid sites in the zeolite, also known as bridging OH—H groups, may form hydrogen bonds with other framework oxygen atoms in the zeolite framework. In embodiments, the method 200 of producing the cracking additive may include ion-exchanging the cracking additive to produce the hydrogen form of the cracking catalyst. In embodiments, ion-exchanging the cracking additive may include treating cracking catalyst with an ammonium salt at a temperature of from 50° C. to 100° C. for a duration of from 1 hour to 12 hours. In embodiments, the cracking additive may be treated with a 1.0 μmolar (M) ammonium nitrate ($NH_4NO_3$) solution. In embodiments, the cracking additive may be treated with a 0.25 normal (N) ammonium nitrate solution. In embodiments, the cracking additive may be treated with the ammonium salt solution at a temperature of from 50° C. to 100° C., from 50° C. to 90° C., from 70° C. to 100° C., from 70° C. to 90° C., or 80° C. In embodiments, the cracking additive may be treated with the ammonium salt solution for a time period of from 1 hour to 12 hours, from 1 hour to 8 hours, from 2 hours to 12 hours, from 2 hours to 8 hours, or 4.5 hours. In embodiments, the cracking additive may be treated with the ammonium salt solution by stirring for 4.5 hours at 80° C. In embodiments, after the cracking catalyst is treated, the cracking additive may be in hydrogen form.

In embodiments, the ion-exchanged hydrogen form of the cracking additive may be calcined at a temperature of from 400° C. to 800° C., from 400° C. to 600° C., from 500° C. to 800° C., from 500° C. to 600° C., or 550° C. In embodiments, the ion-exchanged hydrogen form of the cracking catalyst can be re-calcined at a time period of from 1 hour to 12 hours, from 1 hour to 8 hours, from 2 hours to 12 hours, from 2 hours to 8 hours, or 5 hours. In embodiments, calcining the ion-exchanged hydrogen form of the cracking additive may be conducted after the ion-exchange process is completed.

As previously discussed, the steam catalytic cracking effluent 140 may include one or more products and intermediates, such as but not limited to light hydrocarbon gases, light olefins, aromatic compounds, pyrolysis oil, or combinations of these. The light olefins in the steam catalytic cracking effluent 140 may include ethylene, propylene, butenes, or combinations of these. The steam catalytic cracking effluent 140 may include light aromatic compounds. The light aromatic compounds may include, but are not limited to benzene, toluene, xylenes, ethylbenzene, and other light aromatic compounds having from 6 to 11 carbon atoms.

The steam catalytic cracking system 110 may achieve a light olefin yield of greater than or equal to 35 wt. %, greater than or equal to 38 wt. %, or greater than or equal to 40 wt. % based on the total weight of stream, such as the steam catalytic cracking effluent 140. In embodiments, the steam catalytic cracking system 110 may achieve a light olefin yield of from 35 wt. % to 60 wt. %, from 35 wt. % to 55 wt. %, from 35 wt. % to 50 wt. %, from 38 wt. % to 60 wt. %, from 38 wt. % to 55 wt. %, from 38 wt. % to 50 wt. %, from 40 wt. % to 60 wt. %, from 40 wt. % to 55 wt. %, or from 40 wt. % to 50 wt. % based on the total weight of the stream, such as the steam catalytic cracking effluent 140.

The steam catalytic cracking system 110 may achieve a light aromatic compounds yield of greater than or equal to 15 wt. %, greater than or equal to 16 wt. %, or greater than or equal to 17 wt. % based on the total weight of stream, such as the steam catalytic cracking effluent 117. In embodiments, the steam catalytic cracking system 110 may achieve a light aromatic compounds yield of from 15 wt. % to 45 wt. %, from 15 wt. % to 40 wt. %, from 15 wt. % to 35 wt. %, from 16 wt. % to 45 wt. %, from 16 wt. % to 40 wt. %, from 16 wt. % to 35 wt. %, from 17 wt. % to 45 wt. %, from 17 wt. % to 40 wt. %, or from 17 wt. % to 35 wt. % based on the total weight of the stream, such as steam catalytic cracking effluent 140.

Referring again to FIG. 1, the steam catalytic cracking system 110 may further include a cracking effluent separation system 150 disposed downstream of the steam catalytic cracking reactors 130. When the steam catalytic cracking system 110 includes a plurality of steam catalytic cracking reactors 130, the steam catalytic cracking effluents 140 from each of the steam catalytic cracking reactors 130 may be passed to a single shared cracking effluent separation system 150. In embodiments, each steam catalytic cracking reactor 130 may have its own dedicated cracking effluent separation system. The steam catalytic cracking effluent 140 may be passed from the steam catalytic cracking reactor 130 directly to the cracking effluent separation system 150. The cracking effluent separation system 150 may separate the steam catalytic cracking effluent 140 into one or more than one cracking product effluents, which may be liquid or gaseous product effluents.

Referring again to FIG. 1, the cracking effluent separation system 150 may include one or a plurality of separation units. Separation units may include but are not limited to distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, centrifuges, or combinations or these. The separation units may include one or more gas-liquid separators, one or more liquid-liquid separators, or a combination of these.

In embodiments, the cracking effluent separation system 150 may include a gas-liquid separation unit 160 and a centrifuge unit 170 positioned downstream of the gas-liquid separation unit 160. The gas-liquid separation unit 160 may operate to separate the steam catalytic cracking effluent 140 into a liquid effluent 162 and a gaseous effluent 164. The gas-liquid separation unit 160 may operate to reduce the temperature of the steam catalytic cracking effluent 140 to condense constituents of the steam catalytic cracking effluent 140 having greater than or equal to 5 carbon atoms. The gas-liquid separation unit 160 may operate at a temperature of from 10° C. to 15° C. to ensure that normal pentane and constituents with boiling point temperatures greater than normal pentane are condensed into the liquid effluent 162. The liquid effluent 162 may include distillation fractions such as naphtha, kerosene, gas oil, vacuum gas oil; unconverted feedstock; residue; water; or combinations of these. The liquid effluent 162 may include the light aromatic compounds produced in the steam catalytic cracking reactor 130, which light aromatic compounds may include but are not limited to benzene, toluene, mixed xylenes, ethylbenzene, and other light aromatic compounds. The liquid effluent 162 may include at least 95%, at least 98%, at least 99%, or even at least 99.5% of the hydrocarbon constituents of the steam catalytic cracking effluent 140 having greater than or equal to 5 carbon atoms. The liquid effluent 162 may include at least 95%, at least 98%, at least 99%, or even at least 99.5% of the water from of the steam catalytic cracking effluent 140.

The gaseous effluent 164 may include olefins, such as ethylene, propylene, butenes, or combinations of these; light hydrocarbon gases, such as methane, ethane, propane, n-butane, i-butane, or combinations of these; other gases, such as but not limited to hydrogen; or combinations of these. The gaseous effluent 164 may include the $C_2$-$C_4$ olefin products, such as but not limited to, ethylene, propylene, butenes (1-butene, cis-2-butene, trans-2-butene, isobutene, or combinations of these), or combinations of these, produced in the steam catalytic cracking reactor 130. The gaseous effluent 164 may include at least 90%, at least 95%, at least 98%, at least 99%, or at least 99.5% of the $C_2$-$C_4$ olefins from the steam catalytic cracking effluent 140. The gaseous effluent 164 may be passed to a downstream gas separation system (not shown) for further separation of the gaseous effluent 164 into various product streams, such as but not limited to one or more olefin product streams.

In embodiments, the liquid effluent 162, which includes the water and hydrocarbon having greater than 5 carbon atoms, may be passed to the in-line centrifuge unit 170. The in-line centrifuge unit 170 may operate to separate the liquid effluent 162 into a liquid hydrocarbon effluent 172 and an aqueous effluent 174. The in-line centrifuge unit 170 may be operated at a rotational speed of from 2500 rpm to 5000 rpm, from 2500 rpm to 4500 rpm, from 2500 rpm to 4000 rpm, from 3000 rpm to 5000 rpm, from 3000 rpm to 4500 rpm, or from 3000 rpm to 4000 rpm to separate the hydrocarbon phase from the aqueous phase.

The liquid hydrocarbon effluent 172 may include hydrocarbons from the steam catalytic cracking effluent 140 having greater than or equal to 5 carbon atoms. The liquid hydrocarbon effluent 172 may include small amounts of hydrocarbons having less than 5 carbon atoms, such as trace amounts of light hydrocarbons not separated out into the gaseous effluent 164. The liquid hydrocarbon effluent 172 may include the light aromatic compounds produced in the steam catalytic cracking reactor 130, which light aromatic compounds may include but are not limited to benzene, toluene, mixed xylenes, ethylbenzene, and other light aromatic compounds. The liquid hydrocarbon effluent 172 may further include other hydrocarbons boiling in the naphtha range, kerosene, diesel, vacuum gas oil (VGO), or combinations of these. The light aromatic compounds may be part of the naphtha fraction of the hydrocarbon effluent 172. The liquid hydrocarbon effluent 172 may include at 90%, at least 95%, at least 98%, at least 99%, or even at least 99.5% of the hydrocarbon constituents from the liquid effluent 162. The liquid hydrocarbon effluent 172 may be passed to a downstream treatment processes for further conversion or separation. At least a portion of the liquid hydrocarbon effluent 172 may be passed back to the steam catalytic cracking reactor 130 for further conversion of hydrocarbons to olefins.

The aqueous effluent 174 may include water and water-soluble constituents from the liquid effluent 162. The aqueous effluent 174 may include some dissolved hydrocarbons soluble in the aqueous phase of the liquid effluent 162. The aqueous effluent 174 may include at least 95%, at least 98%, at least 99%, or even at least 99.5% of the water from the liquid effluent 162. The aqueous effluent 174 may be passed to one or more downstream processes for further treatment. In embodiments, at least a portion of the aqueous effluent 174 may be passed back to the steam catalytic cracking reactor 130 as at least a portion of the water 120 introduced to the steam catalytic cracking reactor 130.

In embodiments, the cracking additive comprising the metal species impregnated on the ZSM-5 zeolite, which is produced by previously described processes, may be used as at least a portion of an FCC catalyst composition for a fluidized catalytic cracking (FCC) reactor. The FCC reactor may be a fluidized bed reactor. In the FCC reactor, the FCC catalyst composition comprising the cracking additive of the present disclosure may be contacted with the hydrocarbon feed, such as crude oil, in the presence of steam to produce light olefins, light aromatic compounds, or combinations of these. In embodiments, the cracking additive included in the FCC catalyst composition may consist of the metal species impregnated on the ZSM-5 zeolite. Suitable FCC processes for catalytically cracking crude oil in the presence of steam are disclosed in U.S. patent application Ser. No. 17/009,008, U.S. patent application Ser. No. 17/009,012, U.S. patent application Ser. No. 17/009,020, U.S. patent application Ser. No. 17/009,022, U.S. patent application Ser. No. 17/009,039, U.S. patent application Ser. No. 17/009,048, and U.S. patent application Ser. No. 17/009,073, all of which are incorporated by reference in their entireties in the present disclosure. The hydrocarbon feed can be any of the hydrocarbon feeds previously discussed in the present disclosure. The FCC reactor may be an upflow or a downflow FCC reactor. The FCC reactor system can include one or a plurality of FCC reactors, with one or a plurality of catalyst regenerators.

In embodiments, the FCC reactor may be operated at a reaction temperature of at least about 500° C., such as a reaction temperature of from 500° C. to 800° C., from 550° C. to 800° C., from 600° C. to 800° C., from 650° C. to 800° C., from 500° C. to 750° C., from 550° C. to 750° C., from 600° C. to 750° C., from 650° C. to 750° C., from 500° C. to 700° C., from 550° C. to 700° C., from 600° C. to 700° C., or from 650° C. to 700° C. Steam may be injected to the FCC reactor. The hydrocarbon feed may be catalytically cracked in the presence of the steam with the FCC catalyst composition comprising the cracking additive of the present disclosure. The steam to the hydrocarbon mass ratio in the FCC reactor may be from 0.2 to 0.8, from 0.3 to 0.8, from 0.4 to 0.8, from 0.5 to 0.8, from 0.2 to 0.7, from 0.3 to 0.7, from 0.4 to 0.7, from 0.5 to 0.7, from 0.2 to 0.6, from 0.3 to 0.6, from 0.4 to 0.6, or from 0.5 to 0.6. Steam may refer to all water in the FCC reactor. In embodiments, the residence time of the hydrocarbon feed and the steam in contact with the FCC catalyst composition in the FCC reactor may be from 1 second to 20 seconds, from 2 seconds to 20 seconds, from 5 seconds to 20 seconds, from 8 seconds to 20 seconds, from 1 second to 18 seconds, from 2 seconds to 18 seconds, from 5 seconds to 18 seconds, from 8 seconds to 18 seconds, from 1 second to 16 seconds, from 2 seconds to 16 seconds, from 5 seconds to 16 seconds, from 8 seconds to 16 seconds, from 1 second to 14 seconds, from 2 seconds to 14 seconds, from 5 seconds to 14 seconds, from 8 seconds to 14 seconds, from 1 second to 12 seconds, from 2 seconds to 12 seconds, from 5 seconds to 12 seconds, or from 8 seconds to 12 seconds. In embodiments, the weight ratio of the FCC catalyst composition to hydrocarbon (catalyst to oil) in the FCC reactor may be from 3 to 40, such as from 3 to 30, from 3 to 20, from 5 to 40, from 5 to 30, from 5 to 20, from 5 to 10, from 7 to 40, from 7 to 30, 7 to 20, from 7 to 10, from 10 to 40, from 10 to 30, from 10 to 20, or from 20 to 40. The holding time of 5 hours to produce the cracking additives of Examples 1-7 comprising metal species impregnated on the ZSM-5 zeolites. The cracking additives were pelletized, sieved to particle size of from 500 μm to 1000 μm and tested in fixed-bed reactor. Metal species in the cracking additive and the amount of metal species for each of Examples 1-7 are shown in Table 3.

TABLE 3

| | Metal species precursor | Metal species in the cracking additive | Metal species amount in the cracking additive |
|---|---|---|---|
| Example 1 | chromium(III) nitrate nonahydrate ($Cr(NO_3)_3 \cdot 9H_2O$) | chromium oxide | 2 wt. % |
| Example 2 | ammonium vanadate ($NH_4VO_3$) | vanadium oxide | 2 wt. % |
| Example 3 | iron(III) nitrate nonahydrate ($Fe(NO_3)_3 \cdot 9H_2O$) | iron oxide | 2 wt. % |
| Example 4 | tetra-ammine-platinum(II) nitrate ($Pt(NH_3)_4(NO_3)_2$) | platinum oxide | 1 wt. % |
| Example 5 | ammonium heptamolybdate tetrahydrate (($NH_4)_6Mo_7O_{24} \cdot 4H_2O$) | molybdenum oxide | 2 wt. % |
| Example 6 | cerium(III) nitrate hexahydrate ($Ce(NO_3)_3 \cdot 6H_2O$) | cerium oxide | 2 wt. % |
| Example 7 | nickel nitrate hexahydrate ($Ni(NO_3)_2 \cdot 6H_2O$) | nickel oxide | 2 wt. % | cracking effluent from the FCC reactor can be separated into various product streams, intermediate streams, and an aqueous stream in a separation system downstream of the FCC reactor.

EXAMPLES

The various aspects of the present disclosure will be further clarified by the following examples. The examples are illustrative in nature and should not be understood to limit the subject matter of the present disclosure.

Example 1-7: Preparation of Cracking Additives Comprising a Metal Species Impregnated on the ZSM-5 Zeolite In Examples 1-7, the cracking additives of the present disclosure including different metal species impregnated on the ZSM-5 zeolite were prepared. To prepare the cracking additives, a commercially-available ZSM-5 zeolite powder (CBV3024E ZSM-5 zeolite powder from Zeolyst International having a silica to alumina ratio of 30) was first calcined at 550° C. for 5 hours with a heating rate of 5° C./min. Then, 5 g of the calcined ZSM-5 zeolite powder was mixed with water to produce a zeolite mixture. An appropriate amount of the metal species precursor was added to water to produce a metal precursor mixture. While stirring the zeolite mixture, the metal precursor mixture was slowly added to the zeolite mixture over a period of 1 μmin to 30 μminutes to produce a combined mixture. The combined mixture had a total amount of water of 5 μmilliliters. The metal species precursors for each of Examples 1-7 are shown in Table 3. The combined mixture was stirred at ambient temperature for 3 hours and water was removed by slow evaporation at 60° C. and atmospheric pressure under stirring to produce solid particles. The term "slow evaporation" of the water may refer an evaporation of the water at a temperature less than the boiling point temperature of water. The solid particles were then dried at 100° C. overnight followed by calcination in standing air at a heating rate of 5° C./min to a final calcination temperature of 550° C., with a Comparative Example 8: ZSM-5 Zeolite For Comparative Example 8, the commercially-available ZSM-5 zeolite from Zeolyst International (CBV3024E), which had a silica to alumina ratio of 30, was provided for comparison to the metal species impregnated on the ZSM-5 zeolites of Examples 1-7. The ZSM-5 zeolite of Comparative Example 8 did not have any metals or metal oxides deposited on the surfaces.

Figure 3:
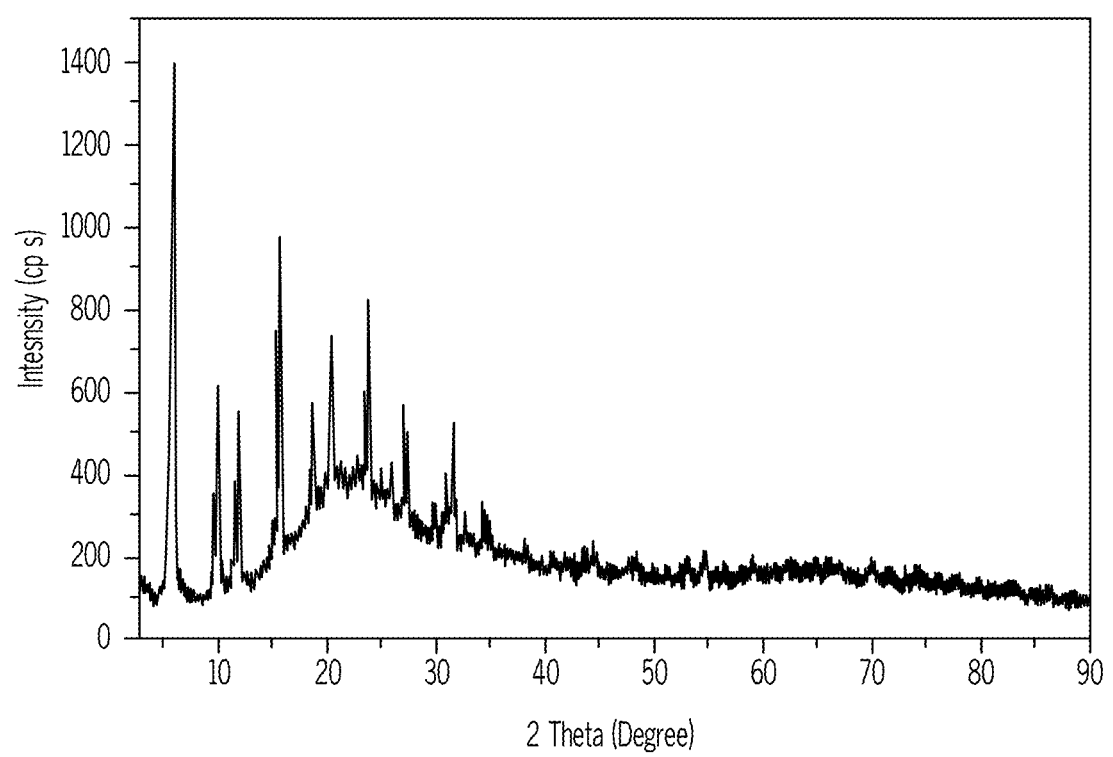
FIG. 3 graphically depicts an X-Ray Diffraction (XRD) spectrum for the FCC catalyst (E-Cat) of Comparative Example 9, which was not impregnated with a metal species.

The commercial ZSM-5 zeolite of Comparative Example 8 was characterized by powder X-ray diffraction (XRD). The XRD was performed on a Rigaku's Mini-flex II system using nickel-filtered CuKα radiation (λ=1.5406 Å) operated in a static scanning mode with a detector angular speed of 2° per minute and a step size of 0.02°. FIG. 3 shows that the X-ray diffraction (XRD) diagram of the zeolite of Comparative Example 8, indicating that this catalyst is a crystalline material with some amorphous phase in the structure. The crystallized phase was identified as mainly Faujasite.

Comparative Example 9: Equilibrium Catalyst

For Comparative Example 9, an Equilibrium Catalyst (ECAT) was provided for comparison to the catalyst additives of Examples 1-7.

Figure 4:
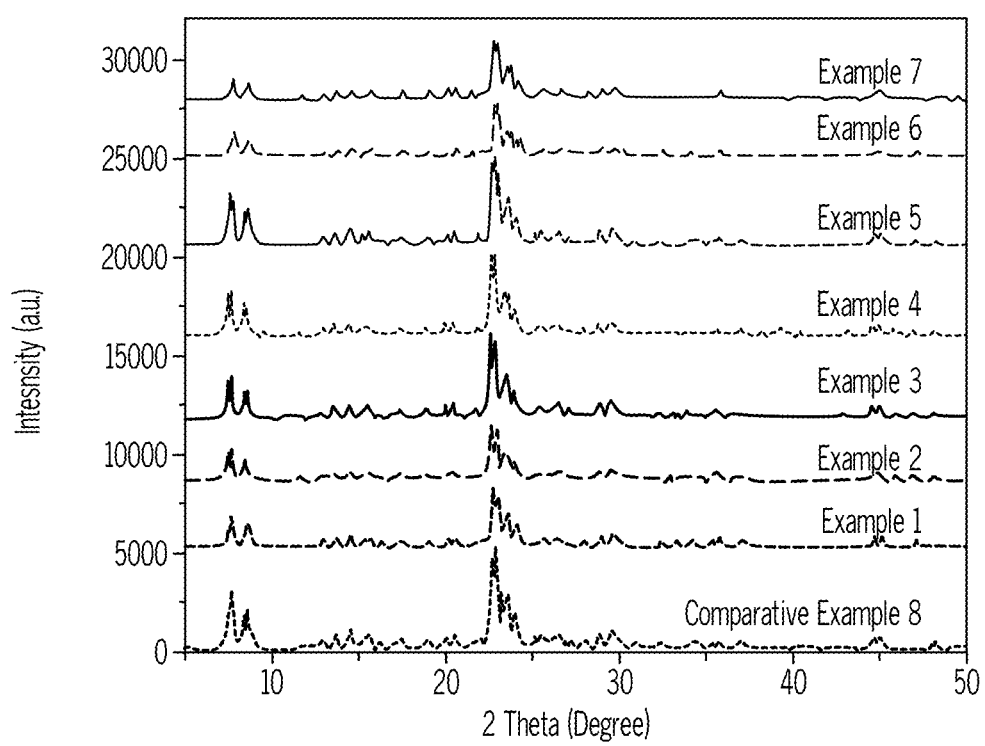
FIG. 4 graphically depicts X-Ray Diffraction (XRD) spectra for the cracking additives of Examples 1-7 comprising the ZSM-5 impregnated with metal species and the zeolite catalyst of Comparative Example 8, according to one or more embodiments shown and described in the present disclosure.

The commercial ECAT of Comparative Example 9 was characterized by powder X-ray diffraction (XRD). The XRD was performed on a Rigaku's Mini-flex II system using nickel-filtered CuKα radiation (λ=1.5406 Å) operated in a static scanning mode with a detector angular speed of 2° per minute and a step size of 0.02°. FIG. 4 shows that the X-ray diffraction (XRD) diagram of ECAT, indicating that this catalyst is a crystalline material with some amorphous phase in the structure. The crystallized phase was identified as mainly Faujasite.

Characterization of Metal Species Impregnated on the ZSM-5 Zeolites of Examples 1-7

The metal species impregnated on the ZSM-5 zeolites of Examples 1-7 were characterized by powder X-ray diffraction (XRD) and nitrogen adsorption, temperature program desorption with ammonia ($NH_3$-TPD) and scanning electron microscope (SEM) images. The XRD was performed on a Rigaku's Mini-flex II system using nickel-filtered CuKα radiation ($\lambda$=1.5406 Å) operated in a static scanning mode with a detector angular speed of 2° per minute and a step size of 0.02°.

As shown in FIG. 3, Examples 1·7 exhibited characteristic peaks of metal species impregnated on the ZSM-5 zeolites in the ranges 2θ=7·10° and 2θ=22·25°. The first peak observed at about 2 θ=7.9° was a superposition of the diffractions from −101, 011, and 101 faces, diffraction from the 011 face being the main peak. The second peak observed at about 2 θ=8.9° was a superposition of the diffraction from the 020, 200, −111, and 111 faces, the diffractions from the 020 and 200 faces being dominant. As shown in FIG. 3 after the metal species impregnation on the ZSM-5 zeolite, the crystallinity of the metal species impregnated on the ZSM-5 zeolites of Examples 1·7 remained almost same, compared to the ZSM-5 zeolite of Comparative Example 8. Furthermore, no peaks of any metal or metal oxide species are observed. This is due to the high dispersion of nanosized particles into the parent ZSM-5 mesopores produced by metal-impregnation.

Further, nitrogen adsorption at −195° C. was performed on a Quanta Chrome's Autosorb-1. Physical properties such as BET surface area, average pore dimeter, and average pore volume and are presented in Table 4. All metal species impregnated on the ZSM-5 zeolites of Examples 1·7 showed a type I isotherm, with the specific surface areas evaluated by BET method of 294·338 $\mu m^2/g$ and micropore volume in the range of 0.091·0.250 $cm^3/g$. The high micropore volumes were in agreement with the high relative crystallinities of all the samples. All prepared metal species impregnated on the ZSM-5 zeolites of Examples 1·7 had a narrow pore distribution of about 5.0 nm.

TABLE 4

Physio-chemical properties of metal species impregnated on the ZSM-5 zeolites of Examples 1-7, ZSM-5 zeolite of Comparative Example 8, and E-cat of Comparative Example 9.

| Example | Metal Type Loading (wt. %) | $SiO_2/Al_2O_3$ (mole ratio) | Surface Area ($m^2/g$) | Pore Diameter (nm) | Pore Volume ($cm^3/g$) |
|---|---|---|---|---|---|
| Comparative Example 9 | — | 3.58 | 167 | 13.04 | 0.163 |
| Comparative Example 8 | — | 30 | 351 | 4.68 | 0.174 |
| Example 1 | 2 | 30 | 317 | 5.32 | 0.157 |
| Example 2 | 2 | 30 | 296 | 4.06 | 0.091 |
| Example 3 | 2 | 30 | 338 | 5.48 | 0.182 |
| Example 4 | 1 | 30 | 332 | 7.83 | 0.250 |
| Example 5 | 2 | 30 | 330 | 5.46 | 0.177 |
| Example 6 | 2 | 30 | 294 | 5.10 | 0.099 |
| Example 7 | 2 | 30 | 332 | 5.66 | 0.194 |

Example 10·16 and Comparative Example 8: Preparation of Cracking Catalyst Compositions For Example 10, a cracking catalyst was prepared by mixing 75 wt. % of the ECAT and 25 wt. % of chromium oxide impregnated ZSM-5 zeolite based on total amount of the cracking catalyst. The ECAT was the same as that of Comparative Example 9. For Example 11, a cracking catalyst was prepared by mixing 75 wt. % of the ECAT and 25 wt. % of vanadium oxide impregnated ZSM-5 zeolite based on total amount of the cracking catalyst. For Example 12, a cracking catalyst was prepared by mixing 75 wt. % of the ECAT and 25 wt. % of iron oxide impregnated ZSM-5 zeolite based on total amount of the cracking catalyst. For Example 13, a cracking catalyst was prepared by mixing 75 wt. % of the ECAT and 25 wt. % of platinum oxide impregnated ZSM-5 zeolite based on total amount of the cracking catalyst. For Example 14, a cracking catalyst was prepared by mixing 75 wt. % of the ECAT and 25 wt. % of molybdenum oxide impregnated ZSM-5 zeolite based on total amount of the cracking catalyst. For Example 15, a cracking catalyst was prepared by mixing 75 wt. % of the ECAT and 25 wt. % of cerium oxide impregnated ZSM-5 zeolite based on total amount of the cracking catalyst. For Example 16, a cracking catalyst was prepared by mixing 75 wt. % of the ECAT and 25 wt. % of nickel oxide impregnated ZSM-5 zeolite based on total amount of the cracking catalyst.

Comparative Example 17

For Comparative Example 17, a cracking catalyst was prepared comprising 100 wt. % of the ECAT of Comparative Example 9 based on total amount of the cracking catalyst. Comparative Example 17 was evaluated at atmospheric pressure in a fixed-bed reaction (FBR) system for steam catalytic cracking of crude oil such as AXL crude oil. A description of the FBR and reaction conditions for conducting steam catalytic cracking of Comparative Example 17 are provided in Example 19.

Comparative Example 18: Cracking Catalyst Evaluation—Thermal Cracking

Figure 7:
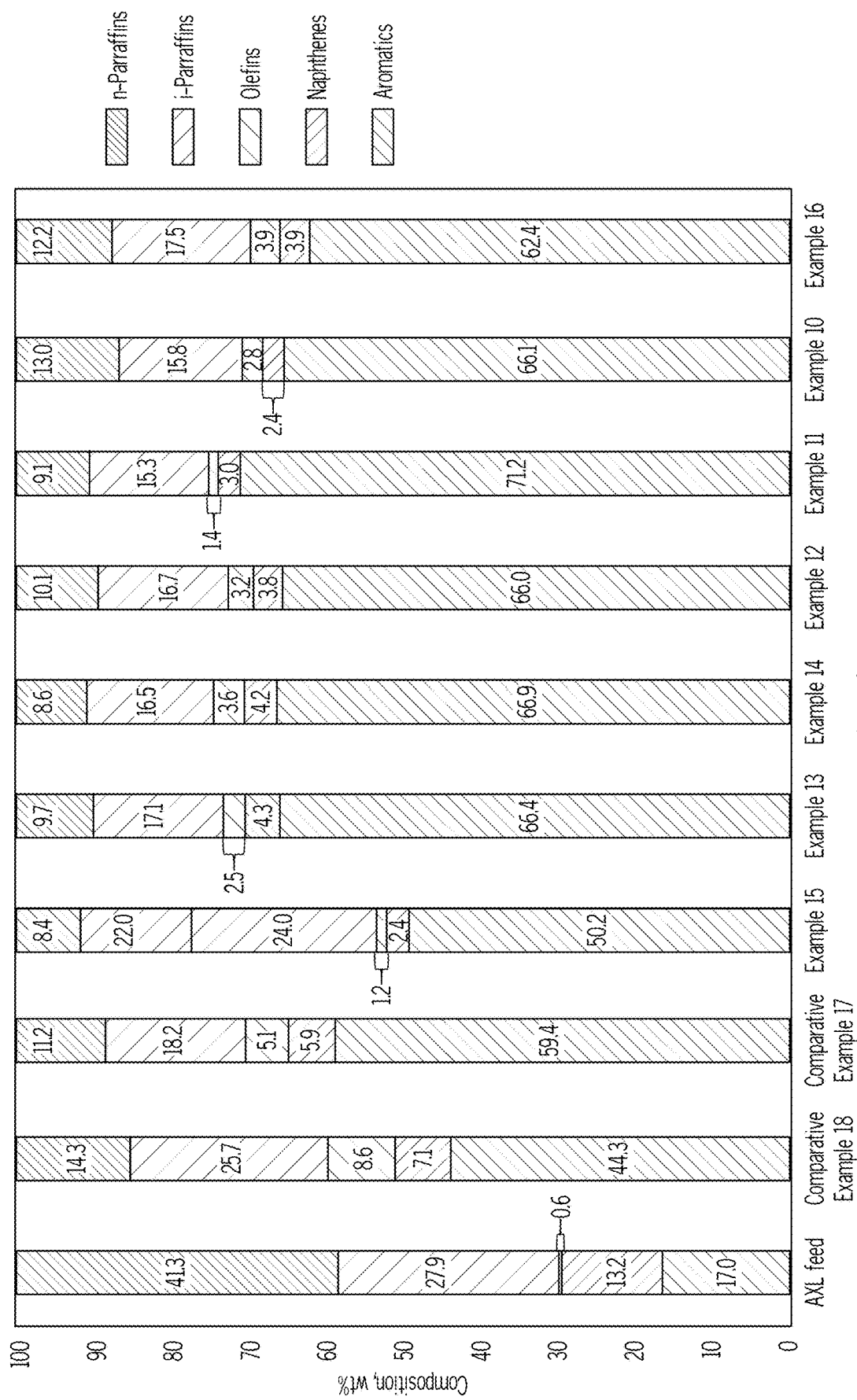
FIG. 7 graphically depicts product yields obtained from cracking an AXL crude oil with the cracking catalyst compositions of Examples 10-16 and Comparative Examples 17-18, according to one or more embodiments shown and described in the present disclosure.
Figure 8:
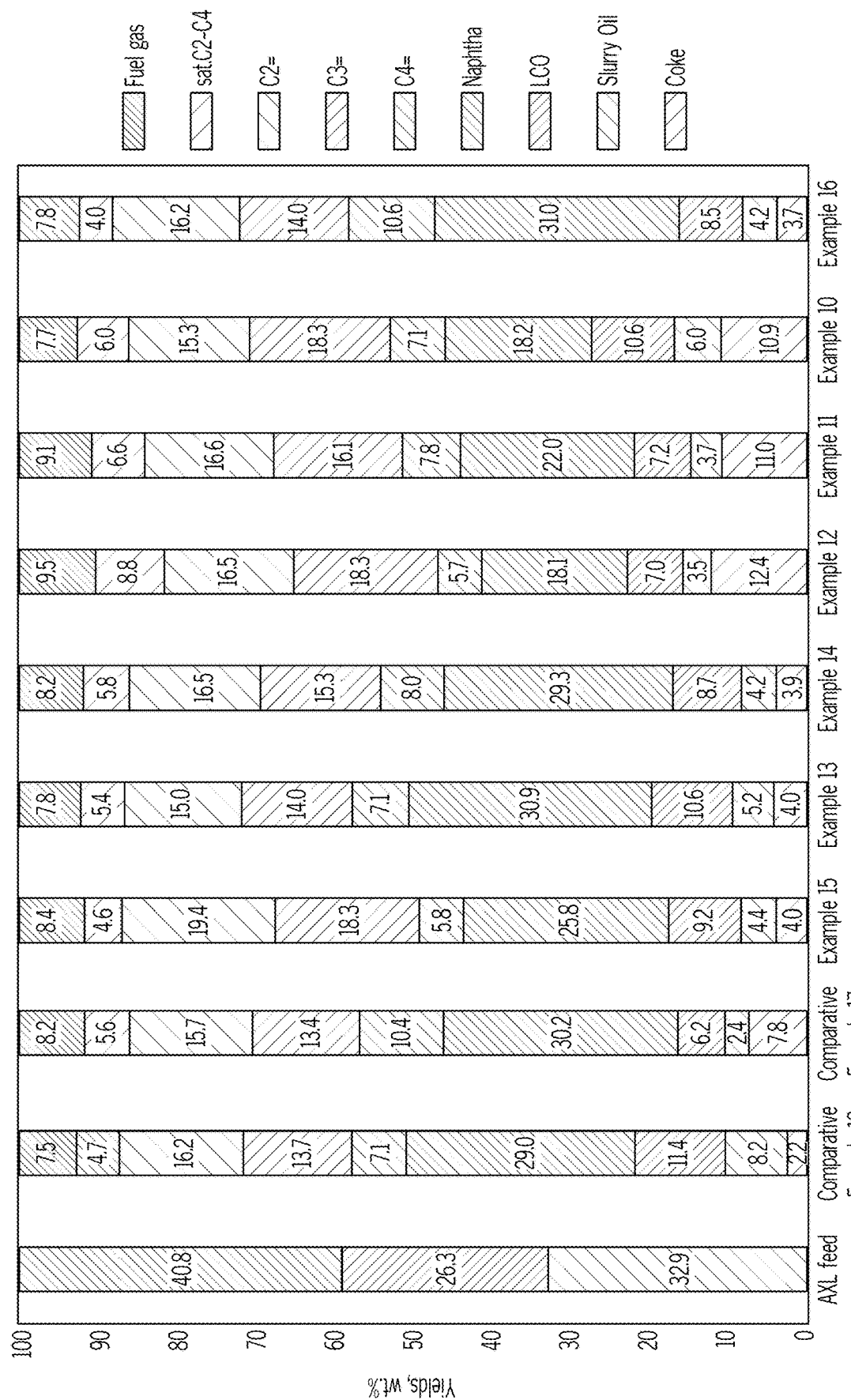
FIG. 8 graphically depicts product yields obtained from cracking a naphtha fraction of an AXL crude oil with cracking catalyst compositions of Examples 10-16 and Comparative Examples 17-18, according to one or more embodiments shown and described in the present disclosure.

In Comparative Example 18, the cracking catalyst of Comparative Example 17 was evaluated at atmospheric pressure in a fixed-bed reaction (FBR) system for thermal catalytic cracking of crude oil such as AXL crude oil. FIG. 6 depicts the FBR system, but steam was not injected for thermal cracking. The general FBR system is described in Example 19. FIGS. 7 and 8 present the results of AXL cracking over the cracking catalyst of Comparative Example 17.

Example 19: Cracking Catalyst Evaluation 1

In Example 19, the cracking catalysts of Examples 10·16 were evaluated at atmospheric pressure in a fixed-bed reaction (FBR) system for steam catalytic cracking of crude oil such as AXL crude oil. FIG. 7 presents the results of AXL cracking over the cracking catalysts of Examples 10·16 and Comparative Example 17.

Referring now to FIG. 6, the FBR system 300 for conducting the experiments of Example 19 is schematically depicted. AXL crude oil 301 was fed to a fixed-bed reactor 340 using a metering pump 311.

Figure 5:
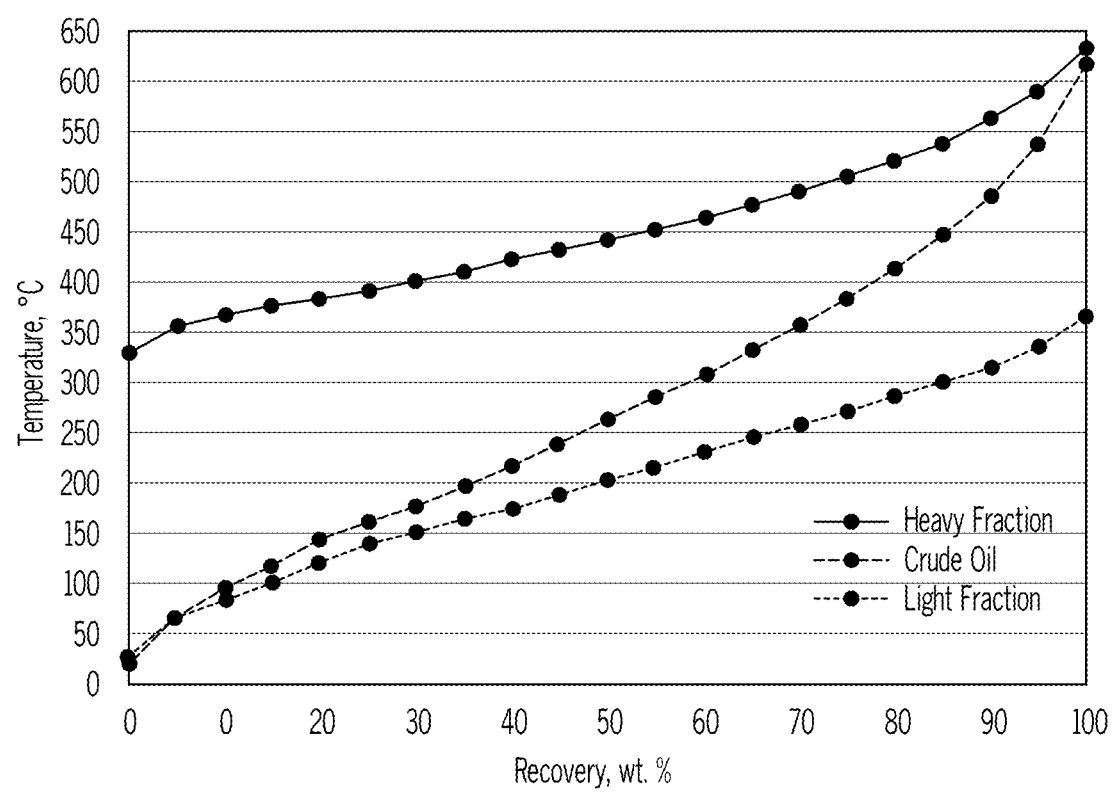
FIG. 5 graphically depicts temperature (y-axis) as a function of recovery weight percent (x-axis) for simulated distillations of an AXL crude oil, a heavy fraction of the AXL crude oil (BP≥350° C.), and a light fraction of the AXL crude oil (BP<350° C.), according to one or more embodiments shown and described in the present disclosure.

The AXL crude oil 301 had an API of 39.3, sulfur content of 1.6 wt. % and total carbon content, hydrogen content, and nitrogen content of 84.3 wt. %, 12.6 wt. % and 0.7 wt. % respectively. The simulated distillation (SimDis) properties of AXL crude oil 301 and two fractions (AXL-350° C. and AXL+350° C.) were analyzed according to ASTM D-2887 μmethod (ASTM (2018)). The gas chromatograph (GC) used was a Shimadzu GC 2010 Plus equipped with a flame ionization detector (FID) to define the three cuts, i.e., naphtha ($C_5$·221° C.), LCO (light cycle oil, 221·343° C.), and HCO (heavy cycle oil, +343° C.). Naphtha PIONA composition (paraffins, iso-paraffins, olefins, naphthenes, and aromatics) was determined using a Shimadzu GC equipped with BP-1 PONA capillary column and an FID detector. As shown in FIG. 5 and Table 5, the results of SimDis showed that the naphtha content is 41 wt. %, while the LCO content is 26 wt. % and the HCO content is 33 wt. %. The residue content (above 550° C.) was 4.0 wt. % for the AXL crude oil 301 and 14.0 wt. % for AXL+350° C.

TABLE 5

Simulated distillation results of AXL crude oil and its two fractions

| Fraction, ° C. | AXL | AXL −350° C. | AXL +350° C. |
|---|---|---|---|
| Naphtha (20-221) | 40.8 | 57.5 | 0.5 |
| LCO (221-343) | 26.3 | 38.9 | 0.8 |
| HCO/Slurry (343+) | 32.9 | 3.7 | 98.7 |
| Residue (>550) | 4.0 | 0 | 14.0 |

* The yields in Table 5 are expressed in units of weight percent based on the total weight of the stream.

A constant feed rate of 2 g/h of the AXL crude oil 301 was used. Water 302 was fed to the fixed bed reactor 340 using a metering pump 312. Water 302 was preheated using a preheater 321. A constant feed rate of 1 g/h of water 302 was used. Nitrogen 303 was used as a carrier gas at 65 μmL/min. Nitrogen 303 was fed to the fixed bed reactor 340 using a Mass Flow Controller (MFC) 313. Nitrogen 303 was preheated using a preheater 322. Water 302 and Nitrogen 303 were mixed using a mixer 330 and the mixture was introduced to the fixed-bed reactor 340. Prior to entering the reactor tube, the AXL crude oil 301, water 302, and nitrogen 303 were preheated up to 250° C. in the pre-heating zone 342. The pre-heating zone 342 was pre-heated using line heaters 331. Crude oil 301 was introduced from the top of the reactor 340 through the injector 341 and mixed with steam in the top two-third of the reactor tube before reaching the catalyst bed 344.

The catalyst bed 344 in the reactor tube 340 was moved a few centimeters down to allow more time for pre-heating of AXL crude oil 301 prior to contacting with the cracking catalyst in the catalyst bed 344. For each experiment, 1 gram (g) of cracking catalyst having a mesh size of 30-40 was placed at the center of the reactor tube 340, supported by quartz wool 343, 346 and a reactor insert 345. Quartz wool 343, 346 was placed both at the bottom and top of the catalyst bed 344 to keep it in position. The height of the catalyst bed 344 was 1·2 cm. The cracking catalysts of Examples 10-16 and Comparative Example 17 were each used as the cracking catalyst a different experiment conducted for Example 6. Prior to conducting the steam catalytic cracking reaction, each of the cracking catalysts of Examples 10-16 and Comparative Example 17 were steam deactivated in the presence of steam at a temperature of 810° C. for 6 hours.

Following steam deactivation, the crude oil hydrocarbon feed and the water/steam were introduced to the reaction tube of the FBR. The reaction was allowed to take place for 45-60 μmin, until steady state was reached. The mass ratio of steam to crude oil was 0.5 grams of steam per gram of crude oil. The crude oil was cracked at a cracking temperature of 675° C. and a weight ratio of catalyst to crude oil of 1:2. The residence time of the crude oil and the steam in the fixed bed reactor 340 was 10 seconds. The total time on stream for each individual experiment of Comparative Example 18 and Example 19 was 5 hours.

The cracking reaction product stream 345 was introduced to a gas-liquid separator 351. A Wet Test Meter 352 was placed downstream of the gas-liquid separator 351. The cracked gaseous products 361 and liquid products 362 were characterized by off-line gas chromatographic (GC) analysis using simulated distillation and naphtha analysis techniques. The reaction product streams from the cracking reaction were analyzed for yields of ethylene, propylene, and butylene. The yield analyses for Comparative Example 18 and Example 19 are depicted in FIG. 7 and provided numerically in Table 6.

TABLE 6

Performance evaluation results of AXL cracking with Examples 10-16 and Comparative Examples 17 and 18

| | Feed | Comparative Example 18 | Comparative Example 17 | Example 10 | Example 11 |
|---|---|---|---|---|---|
| Temperature. ° C. | — | 675 | 675 | 675 | 675 |
| Steam/Oil, ratio | — | — | 0.5 | 0.5 | 0.5 |
| Residence time, s | — | 10.0 | 10.0 | 1.0 | 10.0 |
| Conversion, % | — | 67.1 | 86.8 | 68.9 | 81.9 |
| Fuel gas (C1 + H2) | — | 7.5 | 8.2 | 7.7 | 9.1 |
| C2= | — | 16.2 | 15.7 | 15.3 | 16.6 |
| sat. C2-C4 | — | 4.7 | 5.6 | 6.0 | 6.6 |
| C3= | — | 13.7 | 13.4 | 18.3 | 16.1 |
| C4='s | — | 7.1 | 10.4 | 7.1 | 7.8 |
| Naphtha 25-221 | 40.8 | 29.0 | 30.2 | 18.2 | 22.0 |
| Middle 221-343 | 26.3 | 11.4 | 6.2 | 10.6 | 7.2 |
| Heavy 343+ | 32.9 | 8.2 | 2.4 | 6.0 | 3.7 |
| Coke | — | 2.2 | 7.8 | 10.9 | 11.0 |
| Total | — | 100.0 | 99.9 | 100.0 | 100.0 |
| Mass Balance | — | 99.1 | 97.5 | 95.0 | 97.8 |

| | Example 12 | Example 13 | Example 14 | Example 15 | Example 16 |
|---|---|---|---|---|---|
| Temperature. ° C. | 675 | 675 | 675 | 675 | 675 |
| Steam/Oil, ratio | 0.5 | 0.5 | 0.5 | 0.5 | 0.5 |
| Residence time, s | 10.0 | 10.0 | 10.0 | 10.0 | 10.0 |
| Conversion, % | 82.4 | 76.0 | 80.2 | 79.6 | 80.7 |
| Fuel gas (C1 + H2) | 9.5 | 7.8 | 8.2 | 8.4 | 7.8 |
| C2= | 16.5 | 15.0 | 16.5 | 19.4 | 16.2 |
| sat. C2-C4 | 8.8 | 5.4 | 5.8 | 4.6 | 4.0 |

TABLE 6-continued

Performance evaluation results of AXL cracking with
Examples 10-16 and Comparative Examples 17 and 18

| | | | | | |
|---|---|---|---|---|---|
| C3= | 18.3 | 14.0 | 15.3 | 18.3 | 14.0 |
| C4='s | 5.7 | 7.1 | 8.0 | 5.8 | 10.6 |
| Naphtha 25-221 | 18.1 | 30.9 | 29.3 | 25.8 | 31.0 |
| Middle 221-343 | 7.0 | 10.6 | 8.7 | 9.2 | 8.5 |
| Heavy 343+ | 3.5 | 5.2 | 4.2 | 4.4 | 4.2 |
| Coke | 12.4 | 4.0 | 3.9 | 4.0 | 3.7 |
| Total | 100.0 | 99.9 | 100.0 | 100.0 | 99.9 |
| Mass Balance | 95.1 | 96.6 | 97.0 | 95.5 | 96.4 |

* The yields in Table 6 are expressed in units of weight percent based on the total weight of the stream.

The results in Table 6 and in FIG. 7 show that the cracking catalysts of Examples 10-16 having a metal species impregnated on the ZSM-5 zeolites of Examples 1-7 can directly convert crude oil into petrochemical products, such as light olefins and aromatic compounds. From the results, it can be seen that a metal species impregnated on the ZSM-5 zeolites of Examples 1-7 provide high yields of light olefins, which include the ethylene, and propylene.

Examples 10-17 showed the yield of propylene from 14 wt. % to 18.3 wt. %, which is greater than the yield of propylene of Comparative Examples 17 and 18.

Additionally, Examples 10-17 resulted in greater conversion of the middle distillates portion of the hydrocarbon feed, as shown by the reduced concentration of middle distillates and heavy distillates in the cracking effluent produced using the cracking catalysts of Examples 10-17 compared to the cracking effluent produced using the cracking catalyst of Comparative Example 18.

Example 20: Cracking Catalyst Evaluation 2

In Example 20, the cracking catalysts of Examples 10-16 and Comparative Example 17 were evaluated at atmospheric pressure in a fixed-bed reaction (FBR) system for steam catalytic cracking of naphtha composition of crude oil such as AXL crude oil. FIG. 8 presents the results of AXL cracking over the cracking catalysts of Examples 10-16 and Comparative Example 17.

TABLE 7

Naphtha composition (PIONA) of AXL crude feed and
cracked AXL crude oil over Example 15 at 675° C.

| Groups | AXL Crude | Example 15 |
|---|---|---|
| Paraffins | 41.3 | 18.3 |
| i-Paraffins | 27.9 | 18.0 |
| Olefins | 0.6 | 5.4 |
| Naphthenes | 13.2 | 2.0 |
| Aromatics | 17.0 | 56.3 |
| Benzene | 3.5 | 0.2 |
| Toluene | 2.3 | 4.3 |
| Ethyl Benzene | 0.7 | 0.8 |
| m-Xylene | 1.6 | 4.4 |
| p-Xylene | 0.6 | 2.9 |
| o-Xylene | 1.1 | 3.4 |
| C9-C12 | 7.4 | 40.2 |
| TOTAL | 100.0 | 100.0 |

* The yields in Table 7 are expressed in units of weight percent based on the total weight of the stream.

As shown in FIG. 8 and Table 7, the modification of ZSM-5 in Example 15 by impregnating Ce was found to suppress the bimolecular hybrid transfer reaction, and the higher activity can be attributed to the presence of weak acid sites, which could be the main reason for such improvement in light olefins. Furthermore, the dehydrogenation property of Ce species increased ethylene and propylene yield.

Figure 9A:
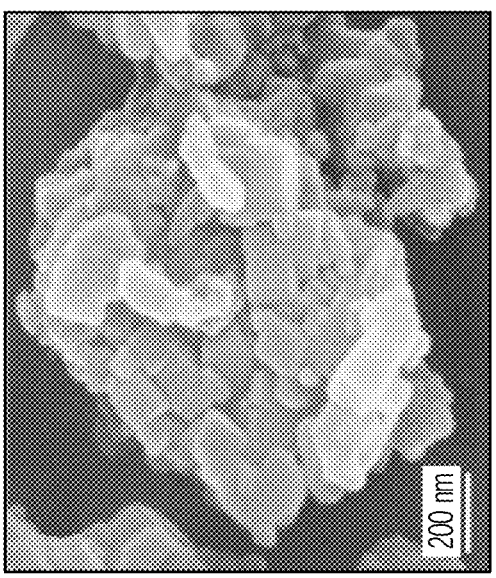
FIG. 9A shows the SEM images of Comparative Example 8.
Figure 9B:
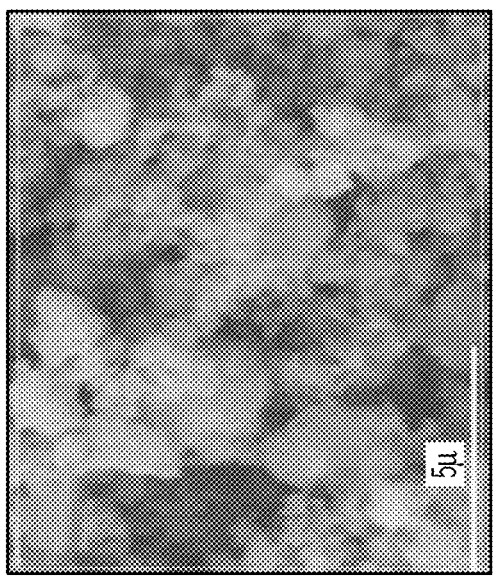
FIG. 9B shows the SEM images of Example 15, according to one or more embodiments shown and described in the present disclosure.
Figure 9C:
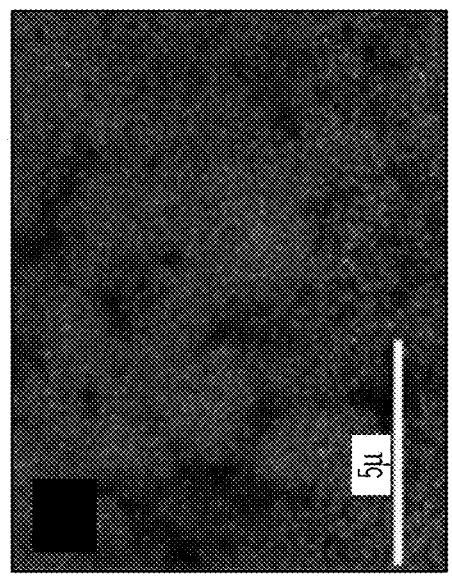
FIGS. 9C-9F show the corresponding elementary mapping, Si (c), Al (d), O (e), and Ce (f), of Example 15, according to one or more embodiments shown and described in the present disclosure.
Figure 9D:
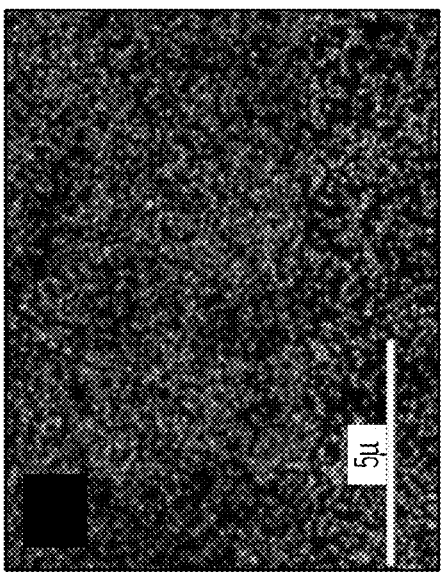
Figure 9E:
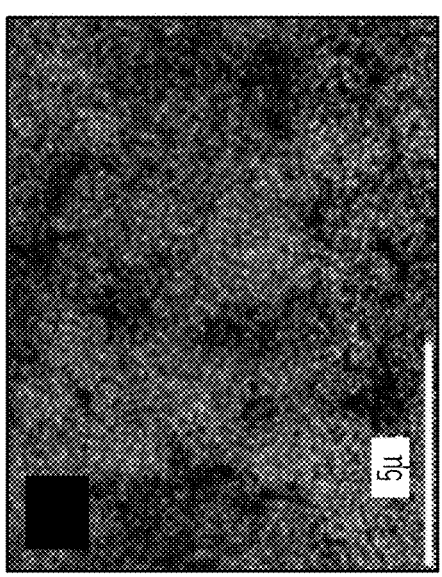
Figure 9F:
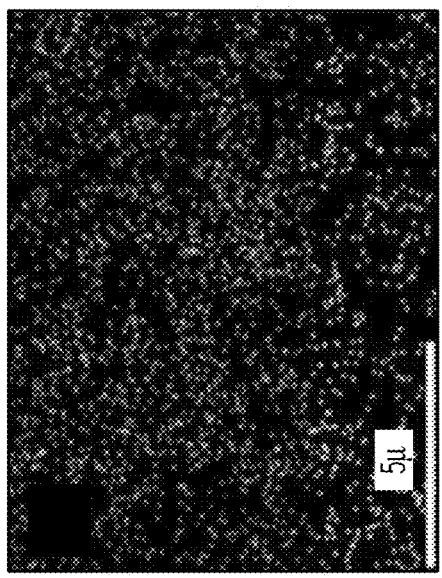

Moreover, as shown in FIG. 9A, Comparative Example 8 possesses well-ordered sharp-edges and square-looking crystallite morphology with a large crystal size of about <150 nm. In contrast, as shown in FIG. 91B, the morphology revealed that Example 15 consists of a mixture of small crystallites with a few large particles. FIGS. 9C-9F show the corresponding elementary mapping, Si (c), Al (d), 0 (e), and Ce (f), of Example 15. As shown in FIGS. 9C-9F, the mapping demonstrates that Ce is present and homogeneously dispersed over the catalyst surface.

A first aspect of the present disclosure may be directed to a process for upgrading a hydrocarbon feed comprising contacting the hydrocarbon feed with steam in the presence of a cracking catalyst composition at reaction conditions sufficient to cause at least a portion of hydrocarbons in the hydrocarbon feed to undergo one or more cracking reactions to produce a steam catalytic cracking effluent comprising light olefins, light aromatic compounds, or both, where the cracking catalyst composition comprises a cracking additive comprising a metal species impregnated on a ZSM-5 zeolite, where the metal species comprises a metal selected from the group consisting of chromium, vanadium, iron, platinum, molybdenum, cerium, and nickel.

A second aspect of the present disclosure may include the first aspect, where the ZSM-5 zeolite of the cracking additive has a molar ratio of silica to alumina of from 20 to 300.

A third aspect of the present disclosure may include either one of the first or second aspects, where the ZSM-5 zeolite of the cracking additive has a molar ratio of silica to alumina of 30.

A fourth aspect of the present disclosure may include any one of the first through third aspects, where a concentration of the metal species in the cracking additive is from 0.1 weight percent (wt. %) to 10 wt. % based on the total weight of the cracking additive.

A fifth aspect of the present disclosure may include any one of the first through fourth aspects, where the metal species is an elemental metal or a metal oxide.

A sixth aspect of the present disclosure may include any one of the first through fifth aspects, where the metal species comprises a metal oxide selected from the group consisting of chromium oxide, vanadium oxide, iron oxide, platinum oxide, molybdenum oxide, cerium oxide, and nickel oxide.

A seventh aspect of the present disclosure may include any one of the first through sixth aspects, where the metal species comprises a single metal oxide selected from chromium oxide, vanadium oxide, iron oxide, platinum oxide, molybdenum oxide, cerium oxide, or nickel oxide.

An eighth aspect of the present disclosure may include any one of the first through seventh aspects, where the cracking additive consists of the ZSM-5 zeolite and the metal species.

A ninth aspect of the present disclosure may include any one of the first through eighth aspects, where the cracking additive is substantially free of phosphorous.

A tenth aspect of the present disclosure may include any one of the first through ninth aspects, where the cracking additive comprises cerium oxide impregnated on a ZSM-5 zeolite, the ZSM-5 zeolite has a molar ratio of silica to alumina of 30, and the cracking additive is essentially free of phosphorous.

An eleventh aspect of the present disclosure may include any one of the first through tenth aspects, where the cracking additive consists essentially of cerium oxide impregnated on a ZSM-5 zeolite.

A twelfth aspect of the present disclosure may include any one of the first through eleventh aspects, where the cracking additive consists of cerium oxide impregnated on a ZSM-5 zeolite.

A thirteenth aspect of the present disclosure may include any one of the first through twelfth aspects, where the cracking additive has an average particle size of 300 μmicrometer (m) to 2000 μm.

A fourteenth aspect of the present disclosure may include any one of the first through thirteenth aspects, where the cracking additive has a surface area of from 200 (square meter per gram) $m^2/g$ to 400 $\mu m^2/g$.

A fifteenth aspect of the present disclosure may include any one of the first through fourteenth aspects, where the cracking additive has an average pore diameter of from 3 nanometers (nm) to 10 nm.

A sixteenth aspect of the present disclosure may include any one of the first through fifteenth aspects, where the cracking catalyst composition comprises a zeolite catalyst and the cracking additive.

A seventeenth aspect of the present disclosure may include any one of the first through sixteenth aspects, where the cracking catalyst composition comprises an equilibrium catalyst and the cracking additive.

An eighteenth aspect of the present disclosure may include any one of the first through seventeenth aspects, where an amount of the cracking additive in the cracking catalyst composition is from 20 wt. % to 30 wt. % based on the cracking catalyst composition.

A nineteenth aspect of the present disclosure may include any one of the first through eighteenth aspects, where the hydrocarbon feed comprises a whole crude oil having an API gravity between 25 and 50.

A twentieth aspect of the present disclosure may include any one of the first through nineteenth aspects, where the hydrocarbon feed is a heavy crude oil, a light crude oil, an extra light crude oil, or combinations of these.

A twenty-first aspect of the present disclosure may include any one of the first through twentieth aspects, where the steam catalytic cracking effluent comprises one or more of ethylene, propylene, butenes, or combinations of these olefins.

A twenty-second aspect of the present disclosure may include any one of the first through twenty-first aspects, where the steam catalytic cracking effluent comprises benzene, toluene, xylenes, ethylbenzene, other light aromatic compounds having from 6 to 11 carbon atoms, or combinations of these.

A twenty-third aspect of the present disclosure may include any one of the first through twenty-second aspects, where the contacting the hydrocarbon feed with the steam in the presence of the cracking catalyst composition comprises contacting the hydrocarbon feed with the steam in the presence of the cracking catalyst composition in a cracking reactor, where the cracking reactor comprises one or more fixed bed reactors, fluidized bed reactor, batch reactor, moving bed catalytic cracking reactor, fluidized catalytic cracking (FCC) reactor, or combinations of these.

A twenty-fourth aspect of the present disclosure may include any one of the first through twenty-third aspects, where the contacting the hydrocarbon feed with the steam in the presence of the cracking catalyst composition comprises contacting the hydrocarbon feed with the steam in the presence of the cracking catalyst at a reaction temperature of from 500° C. to 800° C.

A twenty-fifth aspect of the present disclosure may include any one of the first through twenty-fourth aspects, where the contacting the hydrocarbon feed with the steam in the presence of the cracking catalyst composition comprises contacting the hydrocarbon feed with the steam in the presence of the cracking catalyst at a mass ratio of steam to hydrocarbons of from 0.1 to 1.0.

A twenty-sixth aspect of the present disclosure may include any one of the first through twenty-fifth aspects, where the contacting the hydrocarbon feed with the steam in the presence of the cracking catalyst composition comprises contacting the hydrocarbon feed with the steam in the presence of the cracking catalyst composition for a residence time of from 1 second to 60 seconds.

A twenty-seventh aspect of the present disclosure may include any one of the first through twenty-sixth aspects, where the cracking additive is prepared by a method comprising preparing a zeolite mixture comprising the ZSM-5 zeolite and water, while mixing the zeolite mixture, adding a metal precursor mixture to the zeolite mixture to produce a combined mixture, where the metal precursor mixture comprises a metal species precursor and water, stirring the combined mixture at a temperature of from 10 Celsius (° C.) to 30° C. for a mixing time of from 1 hour to 5 hours, heating the combined mixture to an evaporation temperature of from 30° C. to 100° C. while stirring, maintaining the combined mixture at the evaporation temperature for a period of time from 1 hours to 24 hours, while stirring, where maintaining the combined mixture at the evaporation temperature while mixing causes water to slowly evaporate from the combined mixture to produce solid particles, and slowly evaporating the water from the combined mixture while mixing disperses the metal species precursor over the surfaces of the ZSM-5 zeolite, and calcining the solid particles at a temperature of from 400° C. to 800° C. for 1 hour to 12 hours to produce the cracking additive.

A twenty-eighth aspect of the present disclosure may include any one of the first through twenty-seventh aspects, further comprising drying the solid particles at a temperature of from 50° C. to 150° C. after the maintaining the combined mixture at the evaporation temperature and before the calcining.

A twenty-ninth aspect of the present disclosure may include any one of the first through twenty-eighth aspects, where the metal precursor comprises chromium(III) nitrate nonahydrate ($Cr(NO_3)_3 \cdot 9H_2O$), ammonium vanadate ($NH_4VO_3$), iron(III) nitrate nonahydrate ($Fe(NO_3)_3 \cdot 9H_2O$), tetra-ammine-platinum(II) nitrate ($Pt(NH_3)_4(NO_3)_2$), ammonium heptamolybdate tetrahydrate (($NH_4)_6Mo_7O_{24} \cdot 4H_2O$), cerium(III) nitrate hexahydrate ($Ce(NO_3)_3 \cdot 6H_2O$), or nickel nitrate hexahydrate ($Ni(NO_3)_2 \cdot 6H_2O$).

A thirtieth aspect of the present disclosure may be directed to a cracking catalyst composition for upgrading a hydrocarbon feed comprising a zeolite catalyst, and a cracking additive comprising a metal species impregnated on a ZSM-5 zeolite, where the metal species comprises a metal selected from the group consisting of chromium, vanadium, iron, platinum, molybdenum, cerium, and nickel.

A thirty-first aspect of the present disclosure may include the thirtieth aspect, where a concentration of the metal species in the cracking additive is from 0.1 weight percent (wt. %) to 10 wt. % based on the total weight of the cracking additive.

A thirty-second aspect of the present disclosure may include either one of the thirtieth or thirty-first aspects, where the zeolite catalyst comprises an equilibrium catalyst.

A thirty-third aspect of the present disclosure may include any one of the thirtieth through thirty-second aspects, where an amount of the cracking additive in the cracking catalyst composition is from 20 wt. % to 30 wt. % based on the cracking catalyst composition.

A thirty-fourth aspect of the present disclosure may include any one of the thirtieth through thirty-third aspects, where an amount of the zeolite catalyst in the cracking catalyst composition is from 70 wt. % to 80 wt. % based on the cracking catalyst composition.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for upgrading a hydrocarbon feed, the process comprising:
    passing the hydrocarbon feed to a steam catalytic cracking reactor, where the hydrocarbon feed comprises a crude oil having an API gravity of from 25 to 50; and
    contacting the hydrocarbon feed with steam in the presence of a cracking catalyst composition in the steam catalytic cracking reactor at reaction conditions sufficient to cause at least a portion of hydrocarbons in the hydrocarbon feed to undergo one or more cracking reactions to produce a steam catalytic cracking effluent comprising light olefins, light aromatic compounds, or both, where:
        the cracking catalyst composition comprises a zeolite catalyst and a cracking additive;
        the cracking additive consists of cerium oxide impregnated on a ZSM-5 zeolite;
        the zeolite catalyst is different from the ZSM-5 zeolite of the cracking additive; and
        the cracking additive comprises from 2 wt. % to 10 wt. % of the cerium oxide based on a total weight of the cracking additive.

2. The process of claim 1, where the ZSM-5 zeolite of the cracking additive has a molar ratio of silica to alumina of from 20 to 300.

3. The process of claim 1, where:
    the ZSM-5 zeolite has a molar ratio of silica to alumina of 30.

4. The process of claim 1, where the cracking additive has an average particle size of 300 micrometer (μm) to 2000 μm.

5. The process of claim 1, where the cracking additive has a surface area of from 200 (square meter per gram) m²/g to 400 m²/g.

6. The process of claim 1, where the cracking additive has an average pore diameter of from 3 nanometers (nm) to 10 nm.

7. The process of claim 1, where the zeolite catalyst comprises an equilibrium catalyst.

8. The process of claim 1, where an amount of the cracking additive in the cracking catalyst composition is from 20 wt. % to 30 wt. % based on the cracking catalyst composition.

9. The process of claim 1, where the cracking additive is prepared by a method comprising:
    preparing a zeolite mixture comprising the ZSM-5 zeolite and water;
    while mixing the zeolite mixture, adding a cerium oxide precursor mixture to the zeolite mixture to produce a combined mixture, where the cerium oxide precursor mixture comprises a cerium oxide precursor and water;
    stirring the combined mixture at a temperature of from 10 Celsius (° C.) to 30° C. for a mixing time of from 1 hour to 5 hours;
    heating the combined mixture to an evaporation temperature of from 30° C. to 100° C. while stirring;
    maintaining the combined mixture at the evaporation temperature for a period of time from 1 hours to 24 hours, while stirring, where:
        maintaining the combined mixture at the evaporation temperature while mixing causes water to slowly evaporate from the combined mixture to produce solid particles; and
        slowly evaporating the water from the combined mixture while mixing disperses the cerium oxide precursor over the surfaces of the ZSM-5 zeolite; and
    calcining the solid particles at a temperature of from 400° C. to 800° C. for 1 hour to 12 hours to produce the cracking additive.

10. The process of claim 1, wherein the cracking catalyst composition consists of:
    from 70 wt. % to 80 wt. % of the zeolite catalyst; and
    from 20 wt. % to 30 wt. % of the cracking additive based on the total weight of the cracking catalyst composition.

11. The process of claim 1, where the crude oil has a density of greater than or equal to 0.80 grams per milliliter or an end boiling point of from 500° C. to 1000° C.

12. The process of claim 1, wherein the cracking catalyst composition consists of the zeolite catalyst and the cracking additive.

13. A cracking catalyst composition for upgrading a hydrocarbon feed, wherein the cracking catalyst composition comprises:
- a zeolite catalyst; and
- a cracking additive consisting of cerium oxide impregnated on a ZSM-5 zeolite,
- where the zeolite catalyst is different from the ZSM-5 zeolite of the cracking additive, and
- where the cracking additive comprises from 2 wt. % to 10 wt. % of the cerium oxide based on a total weight of the cracking additive.

* * * * *